|  |

United States Patent
Barnett et al.

(12) United States Patent
Barnett et al.

(10) Patent No.: US 8,572,511 B1
(45) Date of Patent: Oct. 29, 2013

(54) METHOD AND APPARATUS FOR SUPPORTING AN INTEGRATED DISCOVERY AND SEARCH ENVIRONMENT

(75) Inventors: Rodney Barnett, Decatur, IL (US);
Gary D. Burch, Sidney, IL (US);
Maxwell Burnette, Savoy, IL (US);
Charles David Linville, Champaign, IL (US)

(73) Assignee: Ploughman Analytics, Inc., Champaign, IL (US)

( * ) Notice: Subject to any disclaimer, the term of this patent is extended or adjusted under 35 U.S.C. 154(b) by 323 days.

(21) Appl. No.: 12/931,307

(22) Filed: Jan. 28, 2011

(51) Int. Cl.
*G06F 3/00* (2006.01)

(52) U.S. Cl.
USPC ............ 715/848; 715/853; 715/835; 715/968

(58) Field of Classification Search
USPC .................................. 715/848, 853, 835, 968
See application file for complete search history.

(56) References Cited

U.S. PATENT DOCUMENTS

| 5,546,529 | A * | 8/1996 | Bowers et al. ................ 715/848 |
| 6,341,280 | B1 * | 1/2002 | Glass et al. .................. 707/754 |
| 6,405,212 | B1 | 6/2002 | Samu et al. |
| 6,681,222 | B2 | 1/2004 | Kabra et al. |
| 6,925,608 | B1 | 8/2005 | Neale et al. |
| 7,769,752 | B1 | 8/2010 | Turner et al. |
| 8,271,484 | B1 * | 9/2012 | Rajaraman et al. ........... 707/731 |
| 8,332,405 | B2 * | 12/2012 | Wagenblatt et al. .......... 707/736 |
| 2003/0098893 | A1 * | 5/2003 | Makinen ..................... 345/853 |
| 2005/0080770 | A1 * | 4/2005 | Lueder et al. .................. 707/3 |

* cited by examiner

*Primary Examiner* — Michael Roswell
(74) *Attorney, Agent, or Firm* — L. Cho

(57) ABSTRACT

A graphical user interface (GUI) implemented by a computer system is disclosed. The GUI includes a search term entry area operable to allow a user to enter text as a search term. The GU includes a hierarchical tree area operable to display data elements in a multi-level hierarchical tree structure, wherein the data elements are representative of searchable data in a database. The GUI includes a search result area operable to display a result of a search query. The GUI includes a search criteria tree area operable to allow a user to enter a new search query of the searchable data in response to the user's selection of one or more of the search term from the search term entry area, data elements from the hierarchical tree area, and result from the search result area, wherein the search term entry area, hierarchical tree area, search results area, and search criteria tree area are displayed together in a single window on the GUI.

24 Claims, 47 Drawing Sheets

METHOD AND APPARATUS FOR SUPPORTING AN INTEGRATED DISCOVERY AND SEARCH ENVIRONMENT

FIELD

Embodiments of the present invention relate to a graphical user interface. More specifically, embodiments of the present invention relate to a method and apparatus for supporting an integrated discovery and search environment.

BACKGROUND

Information search and retrieval systems have provided tools for finding information. Such tools provide the capability to search for data listed in directories by name, perform free-text searching, or to search using Boolean expressions in text form. These systems, however, did not account for the fact that a user performing a search may need to use more than one style or approach to effectively find the information being sought. For example, a free-text search such as those found commonly on traditional search engines may be helpful in some cases, but in other cases may not allow for the serendipitous discovery afforded by browsing through data displayed in an organized list.

In addition, many of the tools provided by the information search and retrieval systems suffered from drawbacks such as poor ease of use, lack of structure and controlled vocabulary, and difficulty in combining information from multiple facets. Furthermore, many of the tools allowed for searching of information in either a coarse-grained level or a fine-grained level of detail, but not both.

SUMMARY

According to an embodiment of the present invention, a graphical user interface (GUI) includes a search term entry area, a hierarchical tree area, a search criteria tree area, and a search results area. Each of these components is integrated in such a manner to allow a user to iteratively discover, develop and execute a desired search objective. According to an alternate embodiment of the present invention, one or more mapping areas may be used in place of either the hierarchical tree area and/or the search results area to display data elements or results in a different manner.

According to an embodiment of the present invention, the GUI supports complex information seeking patterns, approaches, and paradigms. The GUI facilitates the exploration and discovery of information though an iterative process. For example, the GUI allows for the mixing and matching of paradigms for searching. A user may start out with a directed free text search in the search term entry area, refine the query by editing the granularity of a given criterion, and create a Boolean search with the result and incorporate a search term discovered while browsing through a portion of a hierarchical tree in the hierarchical tree area.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 1 illustrates an exemplary network on which an embodiment of the present invention is implemented on.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known systems, devices, and components are shown in block diagram form to avoid obscuring embodiments of the present invention unnecessarily.

Figure 1:
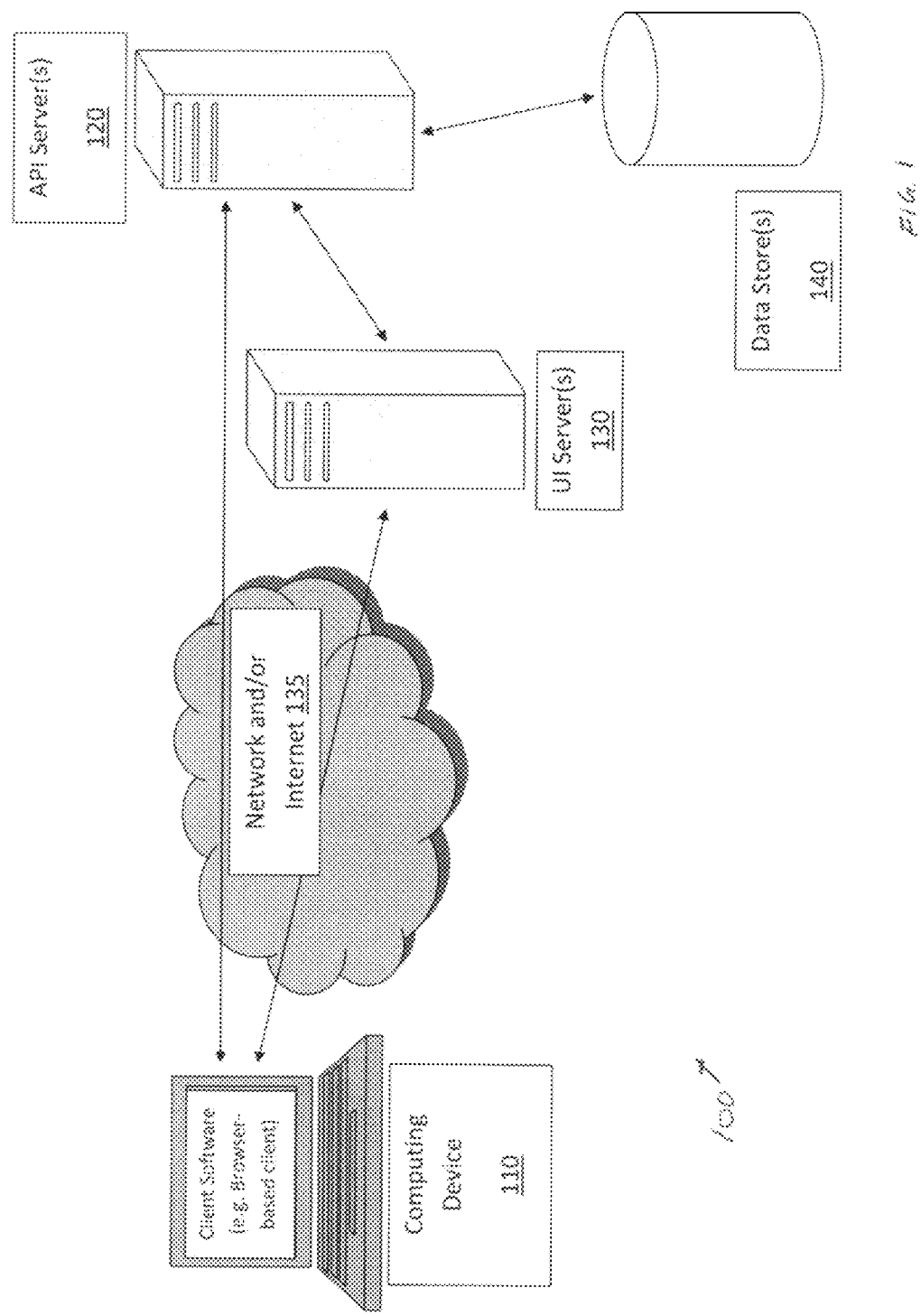

FIG. 1 illustrates a network 100 on which an embodiment of the present is implemented. The network 100 includes a computing device 110. The computing device 110 may be a desktop, laptop, or tablet computer system, a mobile device, or other computing device. The computing device 110 runs a graphical user interface (GUI) that supports an integrated discovery and search environment for searching data. The computing device 110 may be connected to an application programming interface (API) server 120 or to a user interface server 130 via a network 135 such as an internal network or the internet. The API server 120 is connected to a data store 140 which stores persistent data. It should be appreciated that in alternate embodiments of the present invention, the computing device 110 may be connected to the data store 140 in a different manner or may have the data store directly integrated in the computing device 110.

Figure 2:
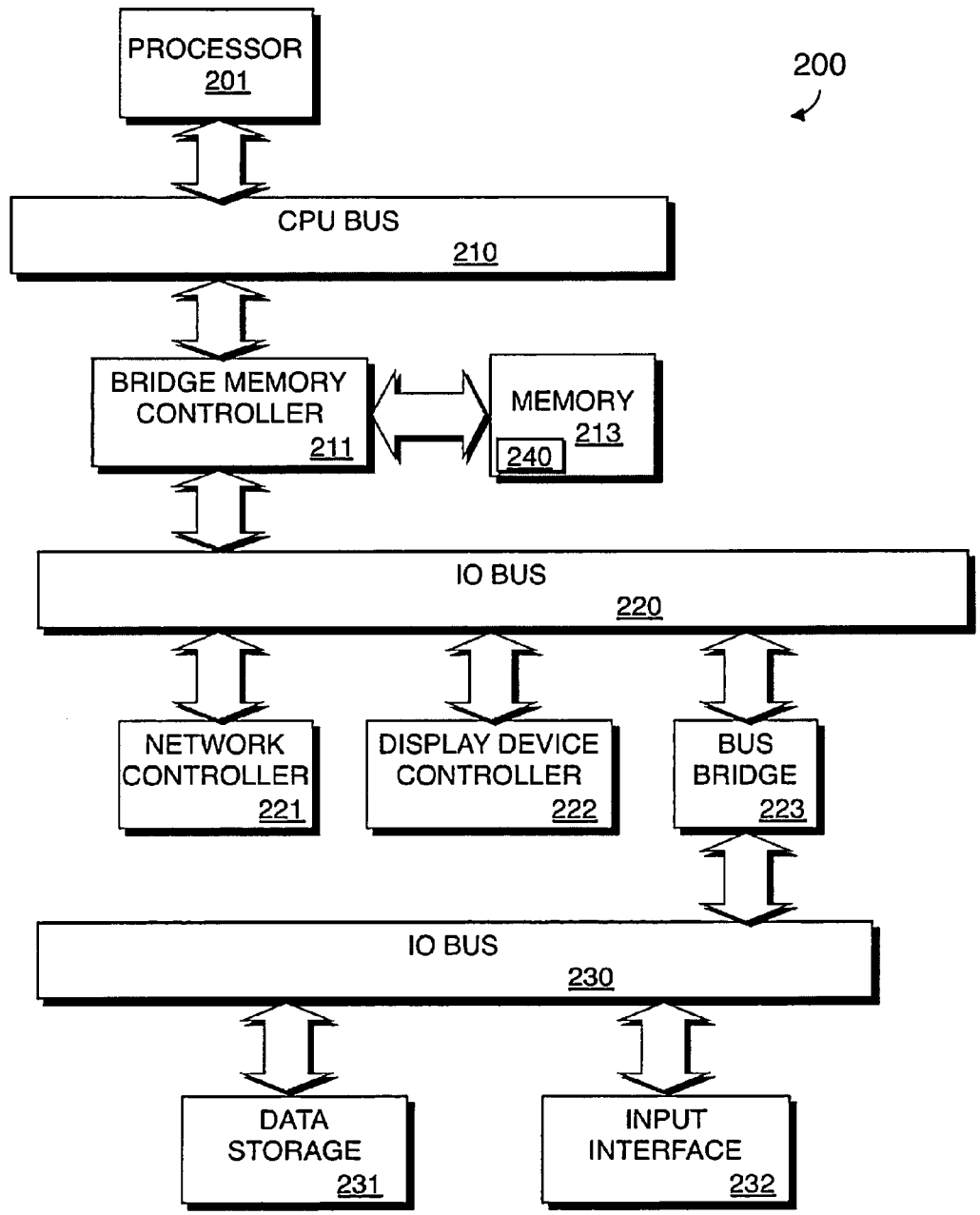
FIG. 2 illustrates a block diagram of an exemplary computer system implementing a graphical user interface (GUI) with an integrated discovery and search environment according to an embodiment of the present invention.

FIG. 2 illustrates a block diagram of a computer system 200 implementing a GUI with an integrated discovery and search environment according to an embodiment of the present invention. The computer system 200 may be used to implement computer device 110 illustrated in FIG. 1. It should be appreciated that a computer system similar to computer system 200 may also be used to implement the API server 120 and UI server 130 illustrated in FIG. 1.

As shown, the computer system 200 includes a processor 201. The processor 201 is coupled to a CPU bus 210 that transmits data signals between the processor 201 and other components in the computer system 200. The computer system 200 includes a memory 213. The memory 213 may be a dynamic random access memory device, a static random access memory device, and/or other memory device. The memory 213 may store instructions and code represented by data signals that may be executed by the processor 201. A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 200.

A second 10 bus 230 may be a single bus or a combination of multiple buses. The second 10 bus 230 provides communication links between components in the computer system 200. A data storage device 231 is coupled to the second 10 bus 230. The data storage device 231 may be a hard disk drive, a floppy disk drive, a CD-ROM device, a flash memory device or other mass storage device. An input interface 232 is coupled to the second 10 bus 230. The input interface 232 allows coupling of an input device to the computer system 200 and transmits data signals from an input device to the computer system 200. A bus bridge 223 couples the first IO bus 220 to the second 10 bus 230. The bus bridge 223 operates to buffer and bridge data signals between the first IO bus 220 and the second 10 bus 230. It should be appreciated that computer systems having a different architecture may also be used to implement the computer system 200.

A GUI 240 may reside in memory 213 and be executed by the processor 201. The GUI 240 may operate to provide an integrated discovery and search environment. According to an embodiment of the present invention, the GUI includes a search term entry area operable to allow a user to enter text as a search term. The GUI also includes a hierarchical tree area operable to display data elements in a multi-level hierarchical tree structure, wherein the data elements are representative of searchable data in a database. The GUI also includes a search result area operable to display a result of a search query. The GUI also includes a search criteria tree area operable to allow a user to enter a new search query of the searchable data in response to the user's selection of one or more of the search term from the search term entry area, data elements from the hierarchical tree area, and result from the search result area, wherein the search term entry area, hierarchical tree area, search results area, and search criteria tree area are displayed together in a single window on the GUI.

Figure 3:
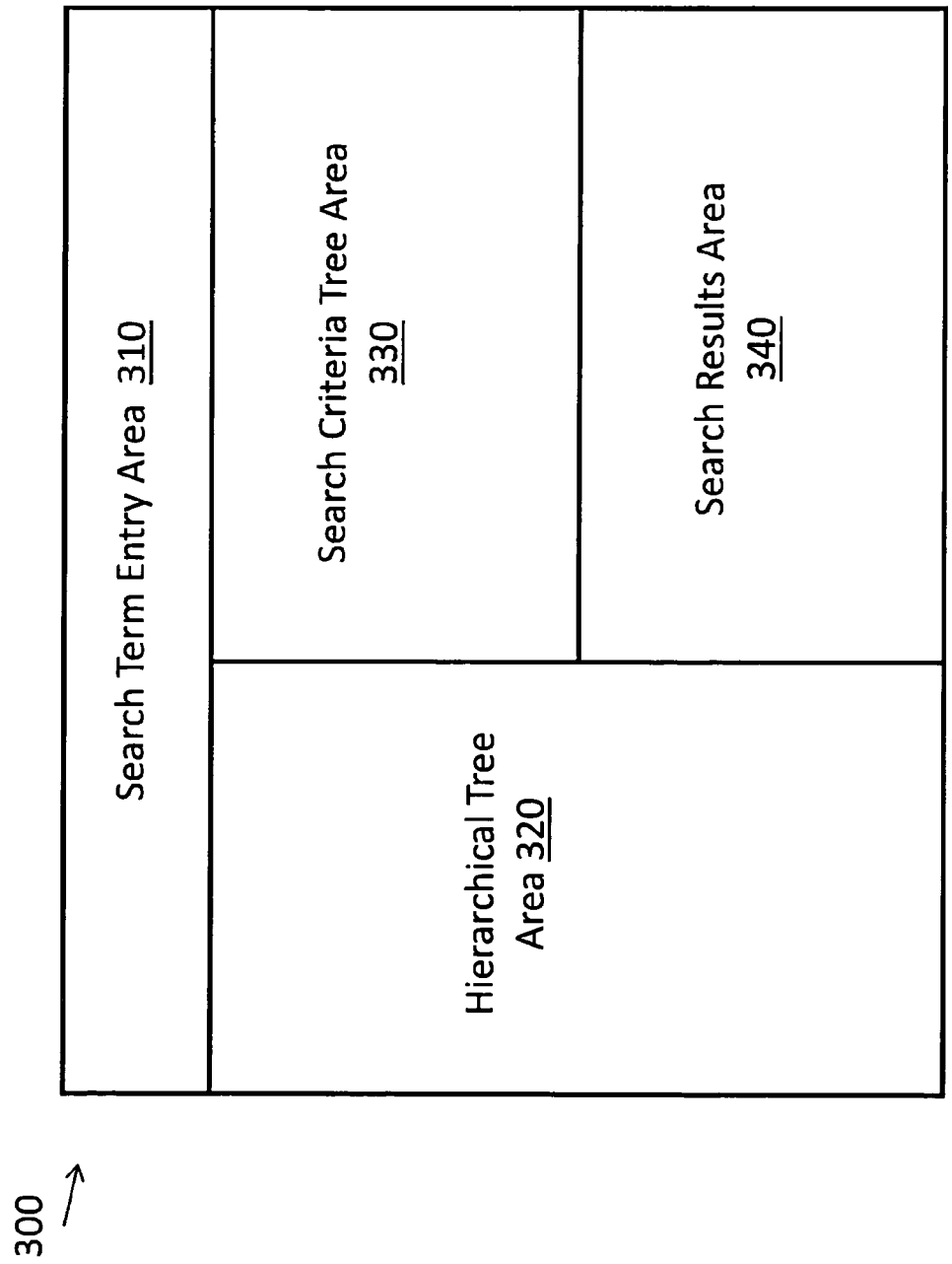
FIG. 3 illustrates an exemplary GUI that may be displayed on a display device of a computing device according to an embodiment of the present invention.

FIG. 3 illustrates an exemplary GUI 300 that may be displayed on a display device of a computing device according to an embodiment of the present invention. The GUI 300 includes search term entry area 310. The search term entry area 310 provides a user an area to enter search terms of phrases to perform a free text search on data. Alternatively, the search term entry area 310 may be used by a user to enter text to identify within a hierarchical tree structure. According to an embodiment of the present invention, the free text entries may include phrases or individual words. Free text entries may be also be stemmed. Free text matching may use fuzzy matching, soundex, and/or wildcards, as well as, other algorithms matching text to data elements.

The GUI 300 includes a hierarchical tree area 320. According to an embodiment of the present invention, the hierarchical tree area 320 displays display data elements in a multi-level hierarchical tree structure. The data elements may be representative of all or a subset of all the searchable data in a data store. The multi-level hierarchical tree structure organizes data into a plurality of levels. Each sub-level provides a more specific description of the data than the level directly above it. It should be appreciated that the multi-level hierarchical tree structure may include any number of levels greater than 1. Portions of the multi-level hierarchical tree structure may be displayed at a time where data elements on the multi-level hierarchical tree structure are selectable to expand what is displayed on the GUI and to show additional sub-levels. As described above, data elements associated with a search term entered in the search term entry area 310 may be highlighted to a user in response to a selection of a highlight option.

The GUI 300 includes a search criteria tree area 330. According to an embodiment of the present invention, the search criteria tree area 330 provides the user an area to enter search criteria for building a search query. For example, Boolean searches may be constructed in the search criteria tree area 330 by selecting and moving (such as dragging and dropping) data elements from the hierarchical tree area 320 and previously returned results from a search results area 340. The search criteria tree area 330 may operate to display the search criteria in a graphical form. According to an embodiment of the present invention, the hierarchical tree area 320 and search criteria tree area 330 may be hidden until a user selects an option to perform an advanced search.

The GUI 300 includes a search result area 340. According to an embodiment of the present invention, the search result area 340 displays results returned from a search query. It should be appreciated that in an alternate embodiment of the present invention, mapping areas may be used in place of the hierarchical tree area 320 and/or the result area 340 to display data elements and results. Alternatively, other graphical or browsable tools may be used in place of the hierarchical tree area 320 and/or the result area 340.

Figure 4:
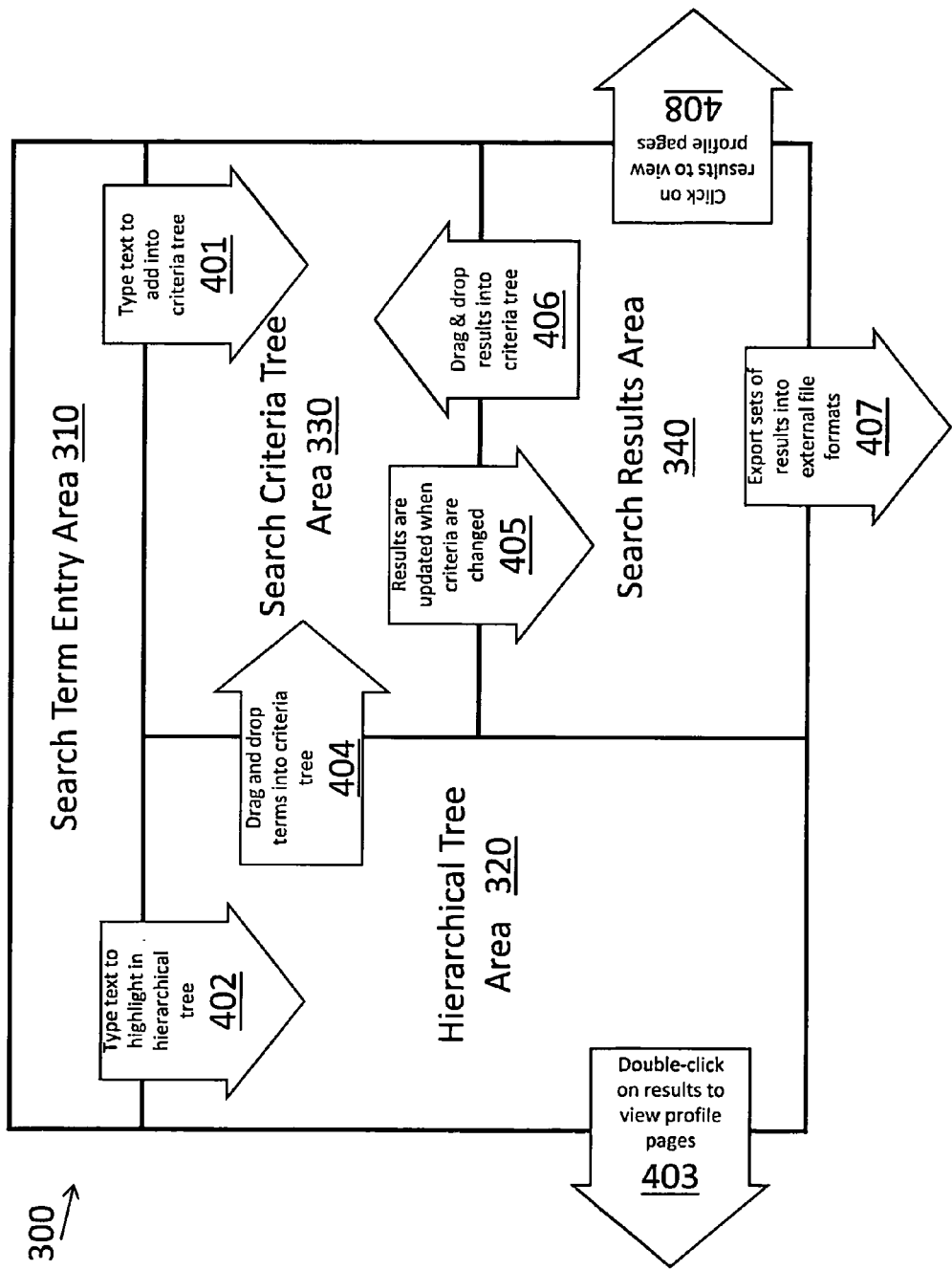
FIG. 4 illustrates exemplary actions supported by the different areas in a GUI according to an embodiment of the present invention.

FIG. 4 illustrates exemplary actions supported by the different areas in the GUI 300 that a user may take to iteratively search for data. These interactions support a user's potentially changing approach to discovery and search.

Starting in the search term entry area 310, a user may enter a term, a set of terms, a phrase, or a combination of terms and phrases into the search term entry area 310. When invoked, the criteria will be added to the search criteria tree area 330. This interaction is illustrated with arrow 401. According to an embodiment of the present invention, the search criteria tree 330 may or may not be visible on the GUI. Upon execution of the search query, the search results are displayed in the search results area 340.

From the search term entry area 310, a user may enter text they wish to find within the hierarchical tree structure (multi-level hierarchical tree structure) in the hierarchical tree area 320. When a highlight action is invoked, the hierarchical tree structure itself is searched for labels of data elements matching the text entered in the search term entry area 310, and the tree structure is expanded as necessary to reveal these labels. This interaction is illustrated with arrow 402.

The hierarchical tree structure in the hierarchical tree area 320 provides a browsable data set that a user can explore to find information sought. By selecting a data element on the hierarchical tree structure, a window is generated that provides additional information on the data element. The additional information may include a detailed profile of the data element. This interaction is illustrated with arrow 403.

Data elements from the hierarchical tree structure may be selected to be entered into the search criteria tree area 330 to formulate a search query. According to an embodiment of the present invention, this may be achieved by dragging the data element across the GUI from the hierarchical tree area 320 to the search criteria tree area 330. This interaction is illustrated with arrow 404.

The search criteria tree area 330 is an area on the GUI 300 where search queries may be formulated. In addition to selecting search terms into the search criteria tree area 330, search terms can be selected out to remove them as search criteria. According to one aspect of the present invention, selection may be achieved by dragging and dropping. It should be appreciated that other methods of selection may be employed. The search criteria entered into the search criteria tree 330 may be taken from the hierarchical tree area 320, search terms entered from the search term entry area 310, and previous results listed in the search results area 340. Each criterion may, in turn, be edited to further specify the level of granularity for a subsequent search query. For example, if a search term in the search criteria tree includes "any relationship" with an organization, an edit dialog provided by the search criteria tree area 330 allows a user to specify a specific "relationship" with the organization.

The search criteria tree area 330 allows Boolean search queries to be formulated by adding grouping folders which act as Boolean operators. User-friendly label such as "All of these" ("AND"), "Any of these" ("OR"), and "Not one of these" ("Exclusion"), may be used to build the search queries. Other user-friendly labels may be used to represent other Boolean functions. It should be appreciated that the Boolean operators can be nested arbitrarily deeply to enable powerful queries. According to an embodiment of the present invention, the search query constructed may be optimized by the computer system implementing the GUI 300 prior to executing the search. The user is given the option to view either the user constructed search query or the optimized query. The results of the executed query are displayed in search results area 340. This interaction is illustrated with arrow 405.

The GUI 300 includes a search results area 340. The search results area 340 is where executed query results are displayed. The results may be displayed in a grid format, a map format, or other format using a different paradigm. As stated above, results displayed in the search results area 340 may be selected and entered into the search criteria tree area 330 to formulate a new search/refine a query. This interaction is illustrated with arrow 406. The search results area 340 may include a filter box to allow the user to enter text that is used to filter the results of the search query displayed in the search results area 340.

The results displayed in the search results area 340 may be saved and exported. A user may select a variety of formats to save the results, such as a Comma-Separated Value (CSV) file, tab-delimited (TAB) file, or other file format. This interaction is illustrated with arrow 407.

By selecting a result in the search results area 340, a window is generated that provides additional information on the result. The additional information may include, for example, a detailed profile of the result. This interaction is illustrated with arrow 408.

Figure 5:
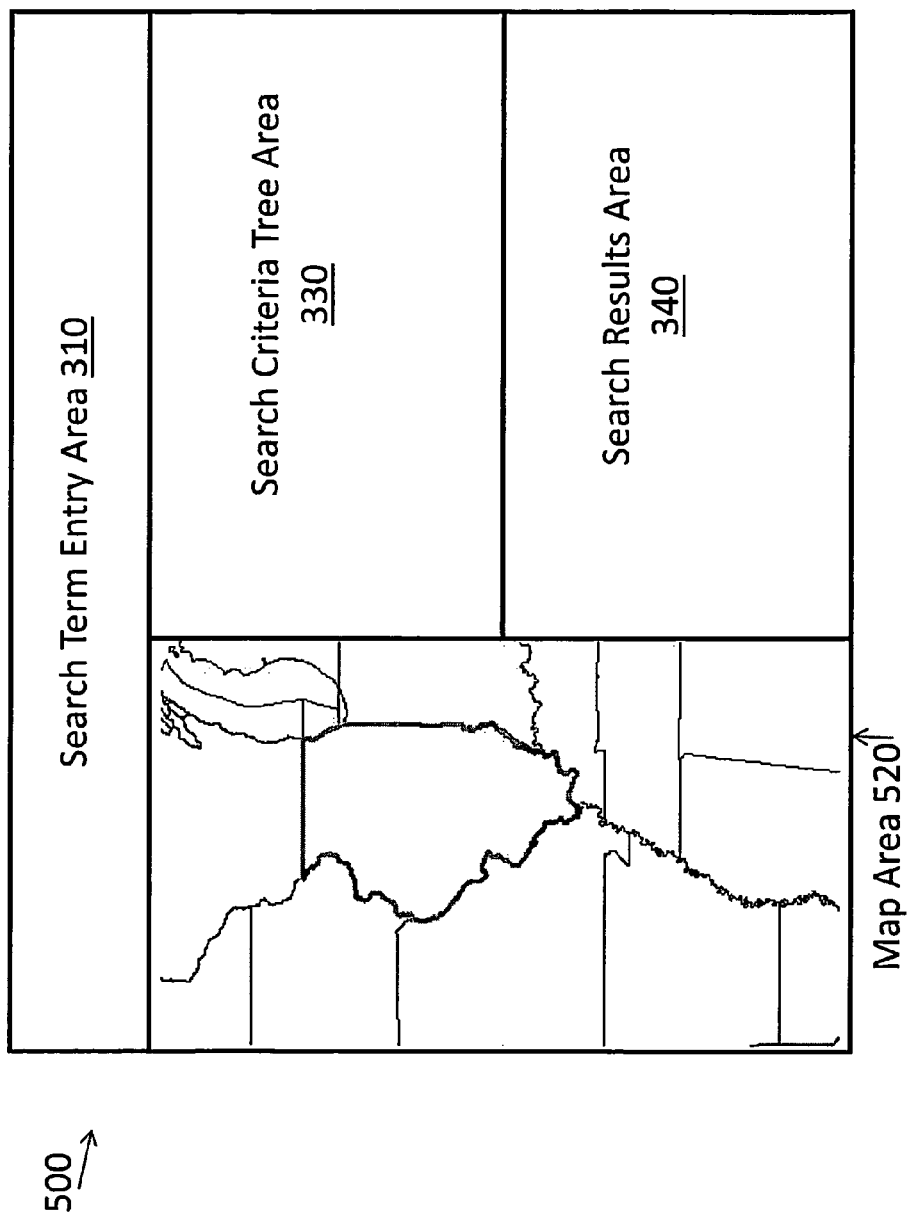
FIG. 5 illustrates an alternate embodiment of the GUI illustrated in FIG. 3 according to an embodiment of the present invention.

FIG. 5 illustrates an alternate embodiment of a GUI 500 according to an embodiment of the present invention. The GUI 500 includes a mapping area 520 in place of a hierarchical tree area 320 as illustrated in FIGS. 3 and 4. According to an embodiment of the present invention, the mapping area 520 may present data in a geographical, abstract map (such as a social graph) or other context. As data elements from a hierarchical tree structure could be selected and moved to the search criteria tree 330, data elements on the mapping area 520 may also be moved to the search criteria tree 330. The data elements in the mapping area 520 may be in the form of markers, cities, or states for example.

Figure 6:
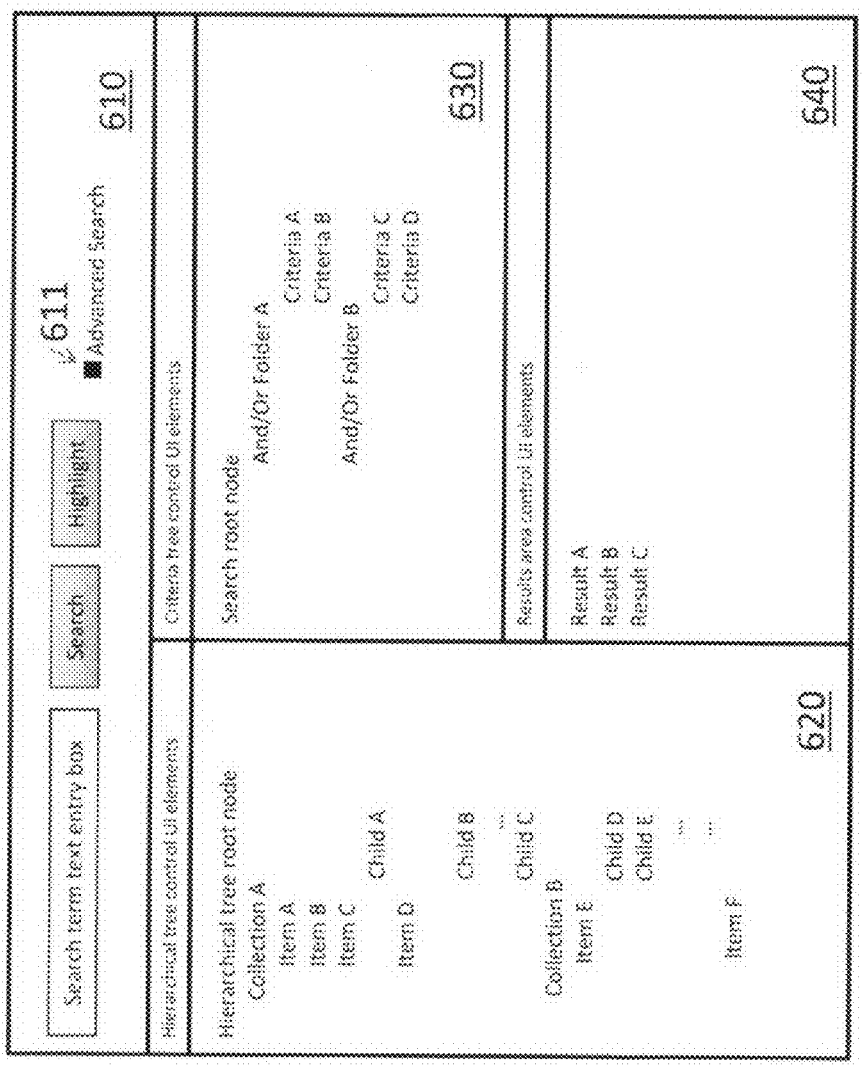
FIG. 6 illustrates a GUI with additional details according to an embodiment of the present invention.

FIG. 6 illustrates a GUI 600 showing additional details of some of the components described with reference to the GUI 300 in FIGS. 3 and 4. The GUI 300 may be implemented with the GUI 600 illustrated in FIG. 6. Areas 610, 620, 630, and 640, may include the functions and features described with reference to areas 310, 320, 330, and 340 illustrated in FIGS. 3 and 4. The GUI 600 includes a search term entry area 610 with an advanced search check box 611. When the advanced search check box is selected, the hierarchical tree area 620 and search criteria tree area 630 are shown. When the advanced search check box 611 is not selected, the hierarchical tree area 620 and search criteria tree area 630 are hidden. Each of the areas 610, 620, 630, and 640 has a set of user interface controls which enable interactions specific to that area. For example, the search tree area 630 allows the user to add a criterion directly to a search query without the need for interaction with other areas.

The GUI 600 allows a user to find, discover, and browse data using multiple tools and paradigms. For example, one paradigm may include browsing, another may include serendipitous discovery, and another may be targeted free text search. The integration of various tools to support searching on the GUI 600 on a single window allows the user to have the flexibility to conduct a rich and thorough search.

Traditional information search and retrieval systems provide tools for finding information. These tools often do not account for the fact that the user performing the search may need to use many different styles and approaches to effectively find the information they seek. For example, a free-text search such as those found on traditional search engines may be helpful in some cases, but may not allow for the serendipitous and/or contextual discovery afforded by browsing through hierarchical tree structures. Finding information may be more closely related to an iterative process in which users refine their notion of what they are looking for even as they refine the actual criteria to enable the acquisition of the information sought. It is likely that elements of information returned as a list of results might become part of the criteria, as well, for example. This may be necessary since the information being sought may have complex relationships to other pieces of information. Relationships may form a hierarchy in which one might want to search at a coarse-grained level of abstraction or a very fine-grained level of detail. Often, it is a combination of the coarse-grained and fine-grained level that provides the most effective results. Embodiments of the GUI of the present invention provide an integrated discovery and search environment in which a user is able to make use of a mix of styles, approaches and strategies to discover and search. This is an improvement over particular implementations of traditional search engines which often require the user to seek information in the manner deemed appropriate by the system developers.

Figure 7:
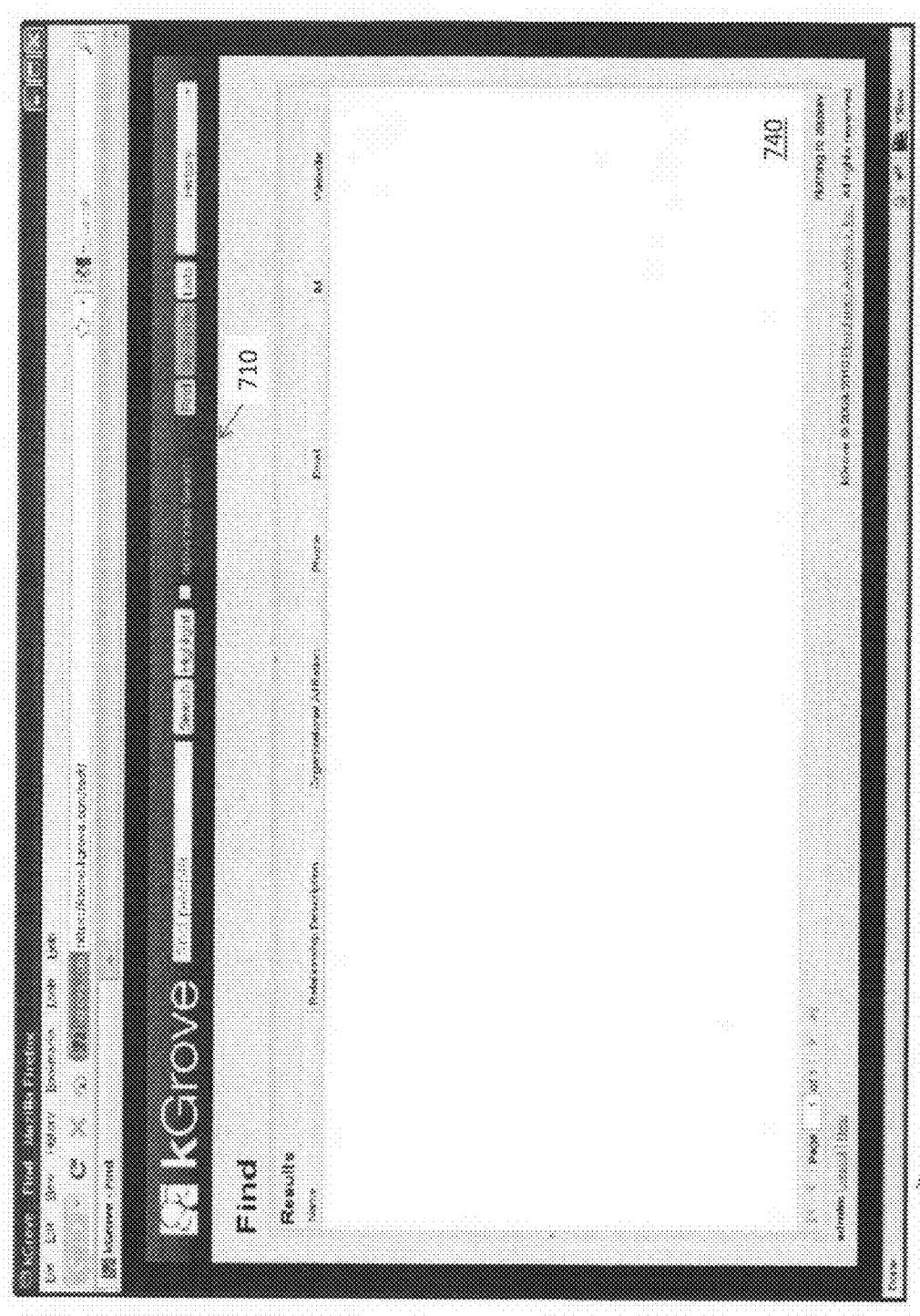
FIGS. 7-34 illustrate exemplary features of a GUI that facilitate search and discovery according to embodiments of the present invention.

FIG. 7 illustrates an embodiment of GUI 700 according to an embodiment of the present invention. As shown, initially the GUI 700 includes a search term entry area 710 and a search results area 740.

Figure 8:
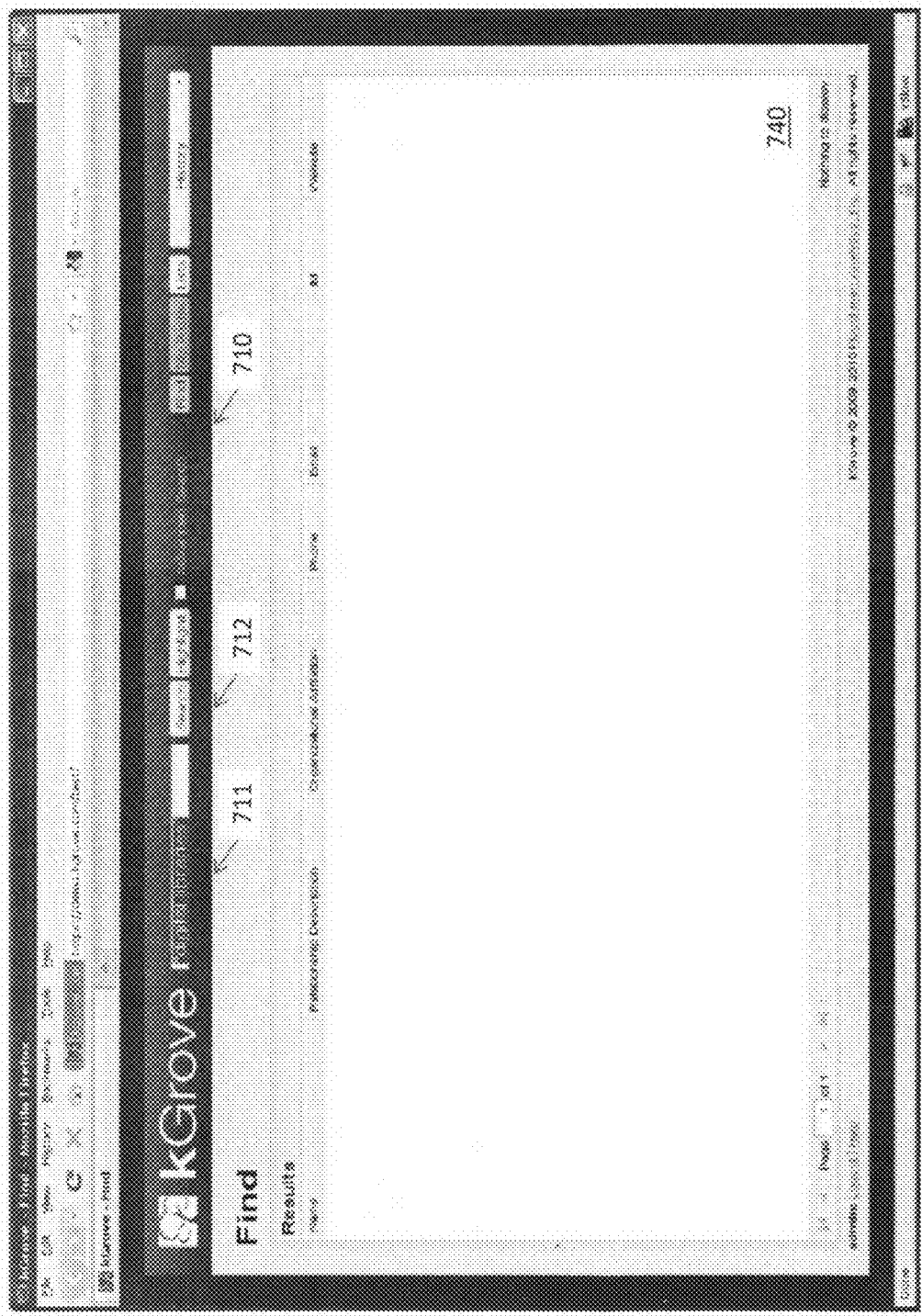

FIG. 8 illustrates an example where a user enters the phrase "digital libraries" in a search box 711 in the search term entry area 710. The search button 712 may be selected to execute the search query.

Figure 9:

FIG. 9 illustrates the GUI 700 after the search query for the phrase "digital libraries" has been executed. Profiles having the phrase "digital libraries" are returned as results in the search results area 740.

Figure 10:
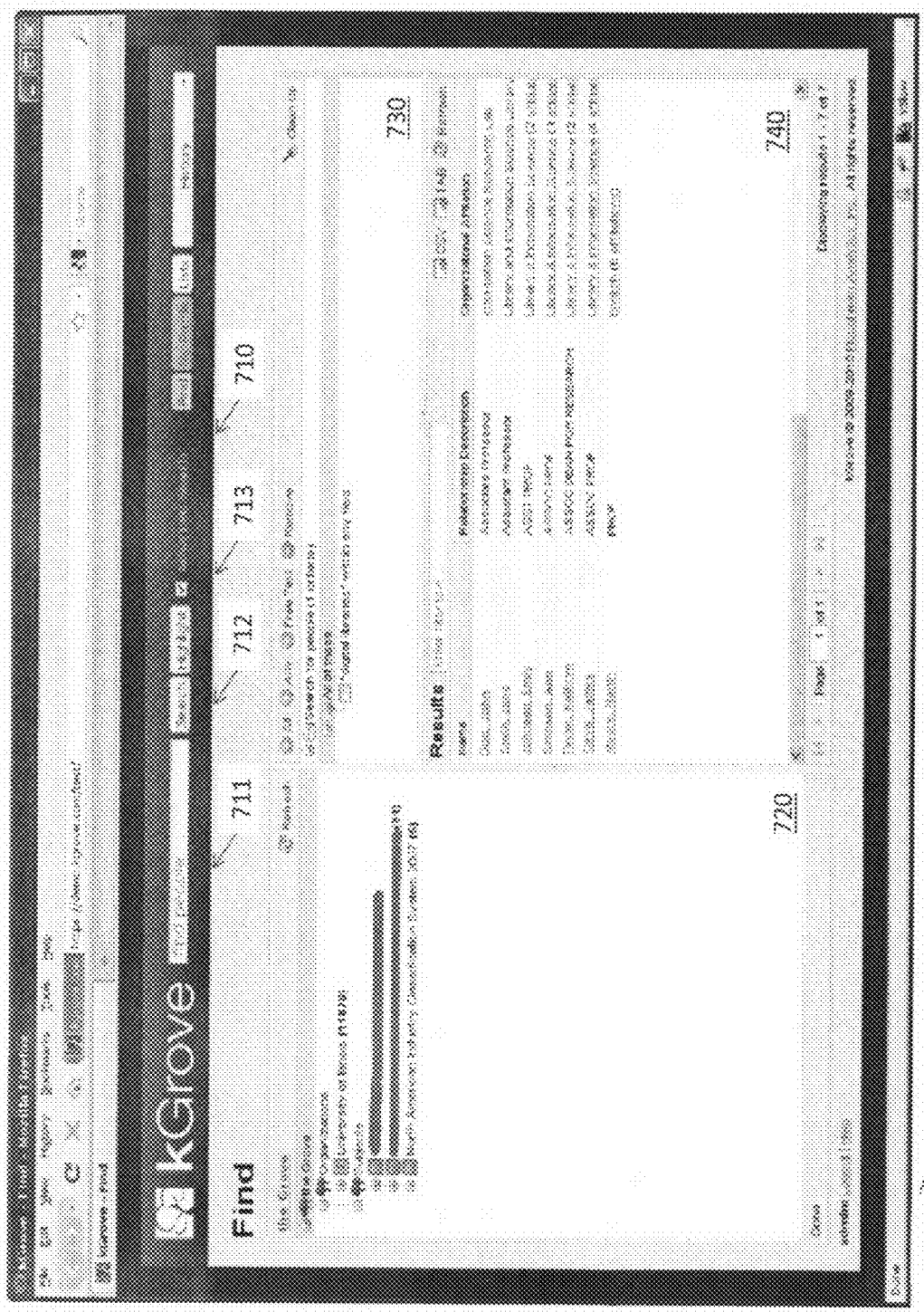

FIG. 10 illustrates the GUI 700 after the advanced search checkbox 713 is selected. As shown, the hierarchical tree area 720 and the search criteria tree area 730 appear on the GUI 700. The searched-for phrase "digital libraries" is listed in the search criteria tree area 730.

Figure 11:
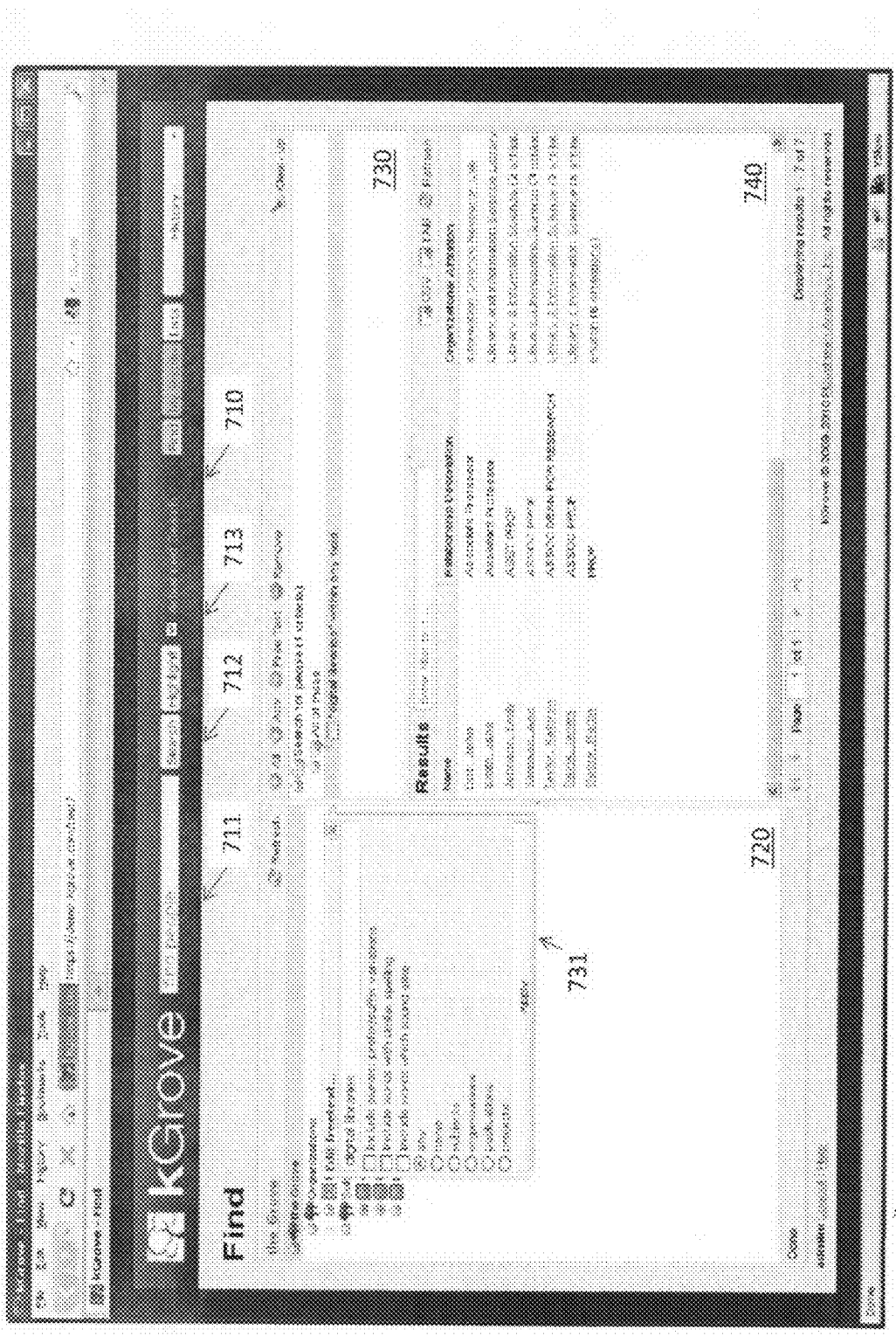

FIG. 11 illustrates the GUI 700 after the "digital libraries" element within the search criteria tree area 730 is selected. As shown, a window 731 appears in response to the user's selection of the element. The window 731 is operable to allow the user to modify a scope of the search query by providing selectable options to further define the search term. In this example, the user may change the level of exactness of the search or limit the scope to certain portions of the profile.

Figure 12:
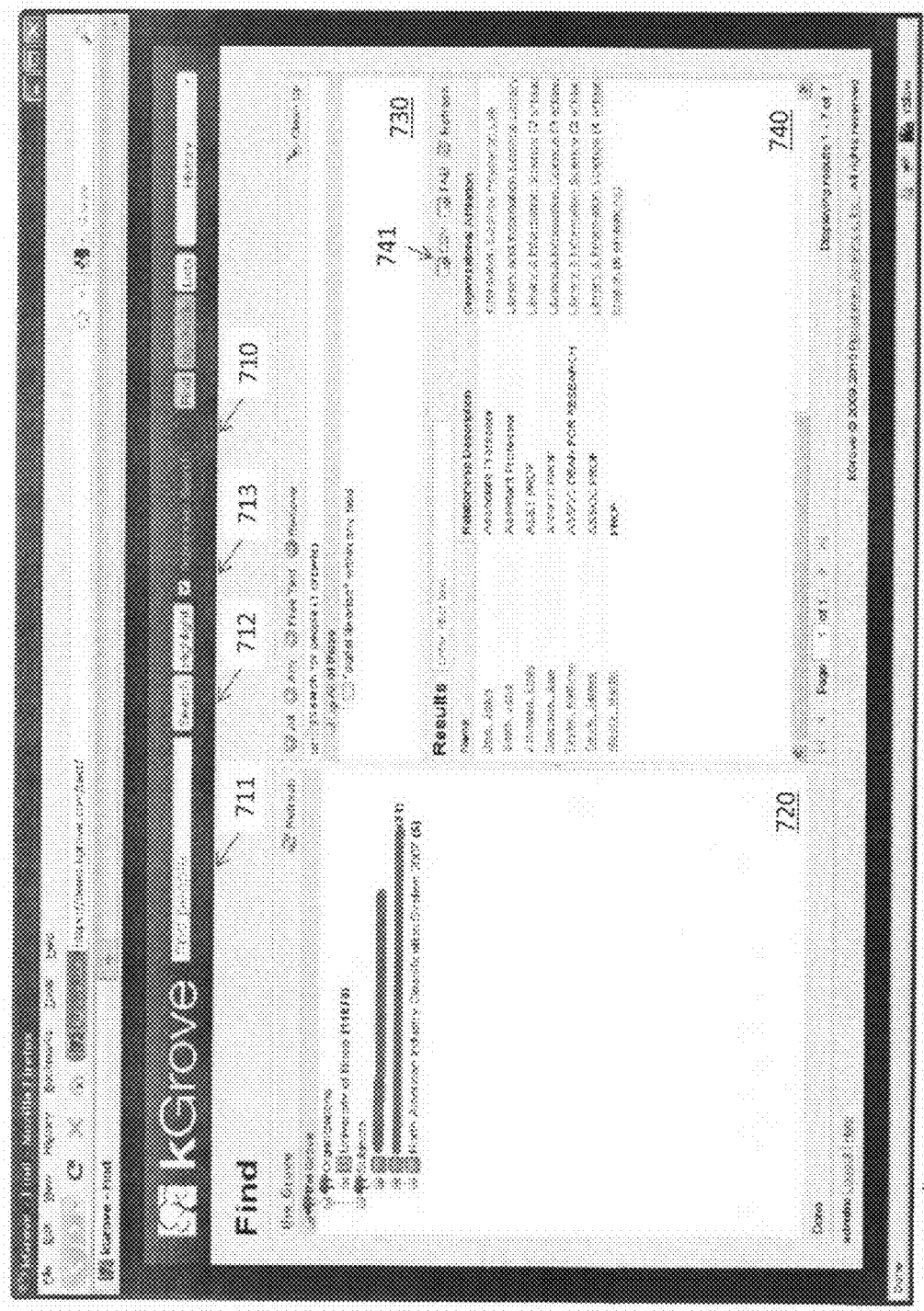

FIG. 12 illustrates the GUI 700 when an export button 741 is selected. As a result, an export to a desired format is initiated. In this example, the user has selected to export the results in a Command Separated Values file format.

Figure 13:
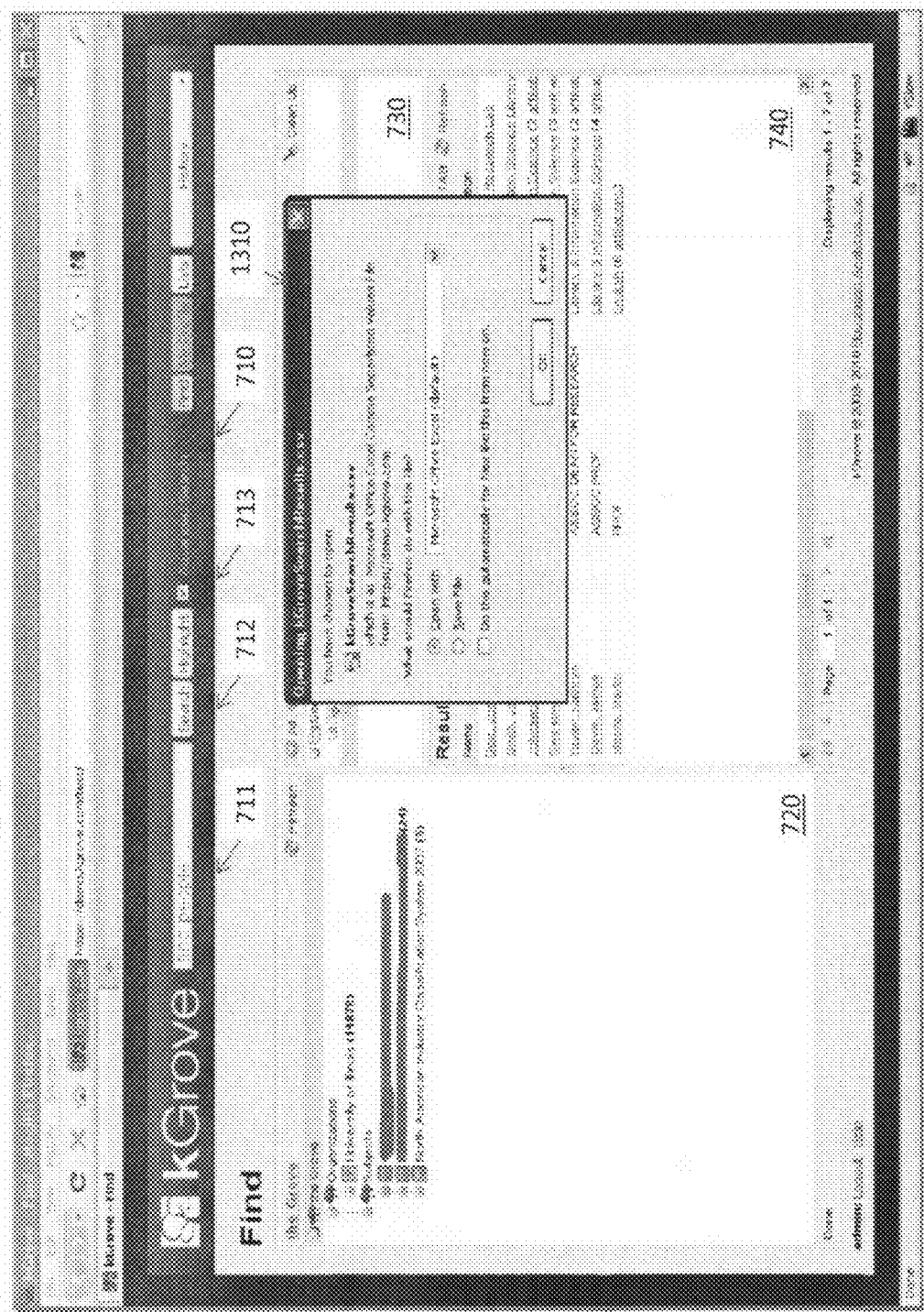

FIG. 13 illustrates the GUI 700 where a window 1310 is generated to provide the user with options on how to process the file to be downloaded.

Figure 14:
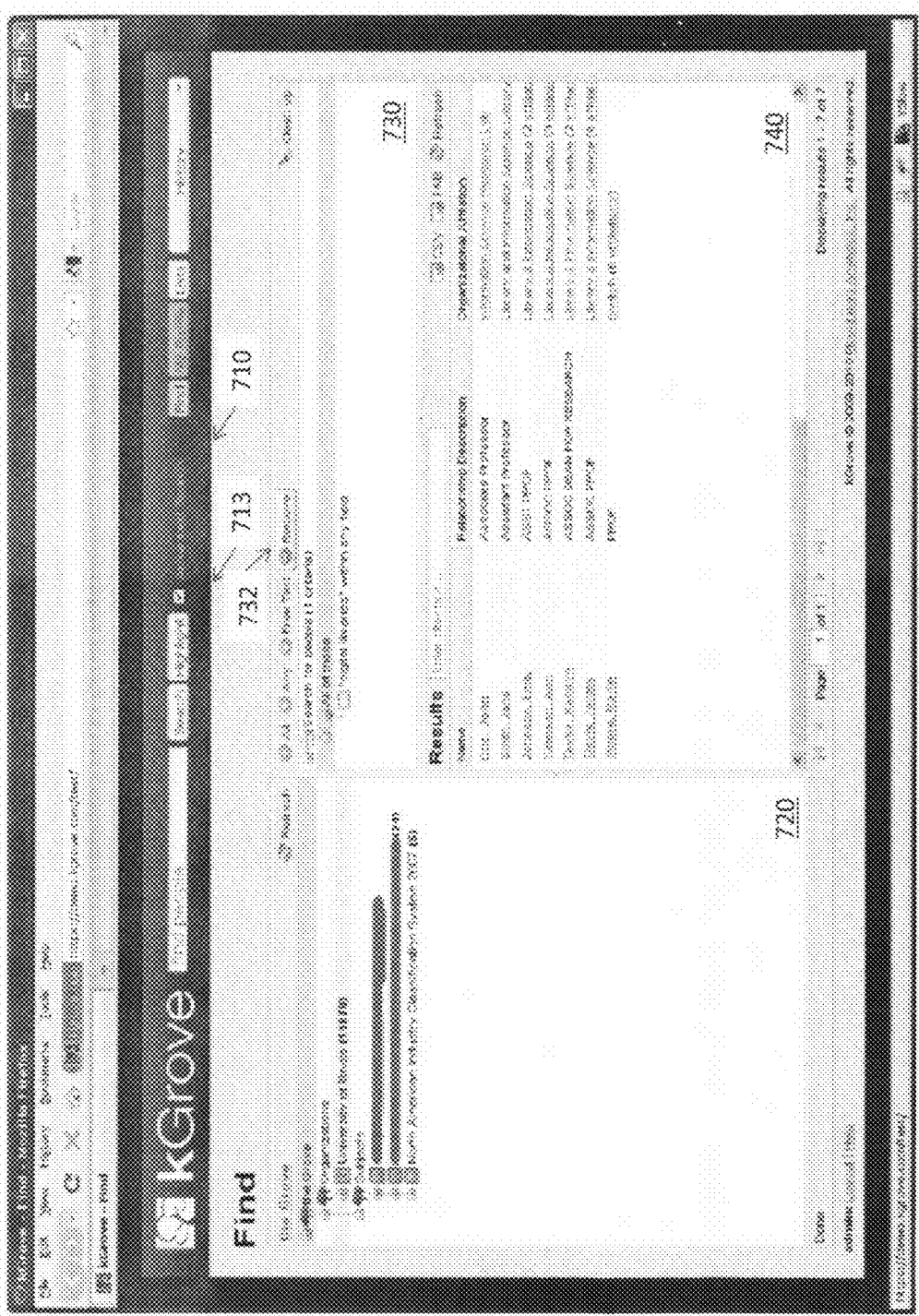

FIG. 14 illustrates the GUI 700 where the criterion listed in the search criteria tree area 730 is selected to be removed. A remove button 732 is selected to invoke the removal.

Figure 15:
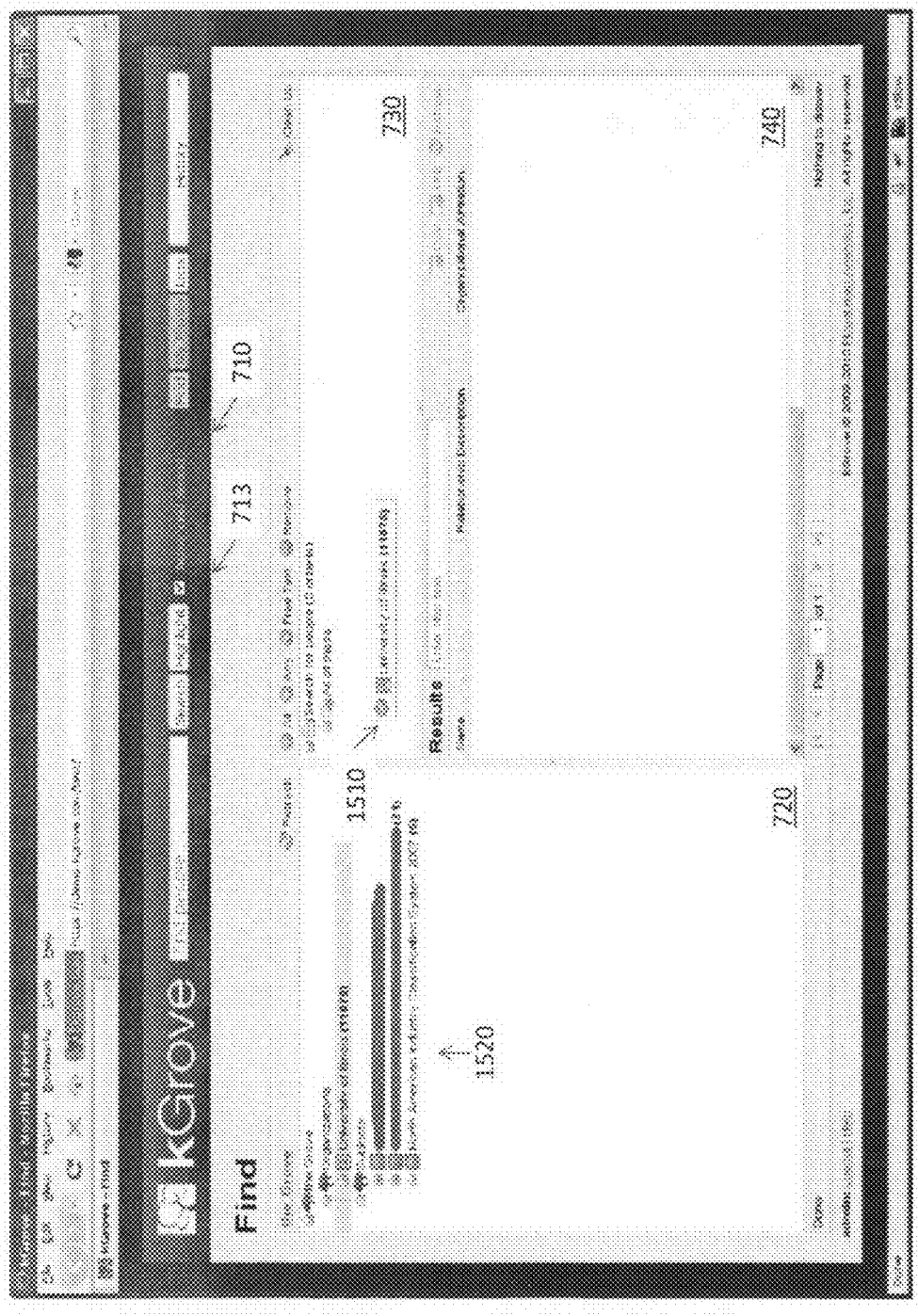

FIG. 15 illustrates the GUI 700 where a data element 1510 from a hierarchical tree structure 1520 in the hierarchical tree area 720 is selected and dragged into the search criteria tree area 730.

Figure 16:
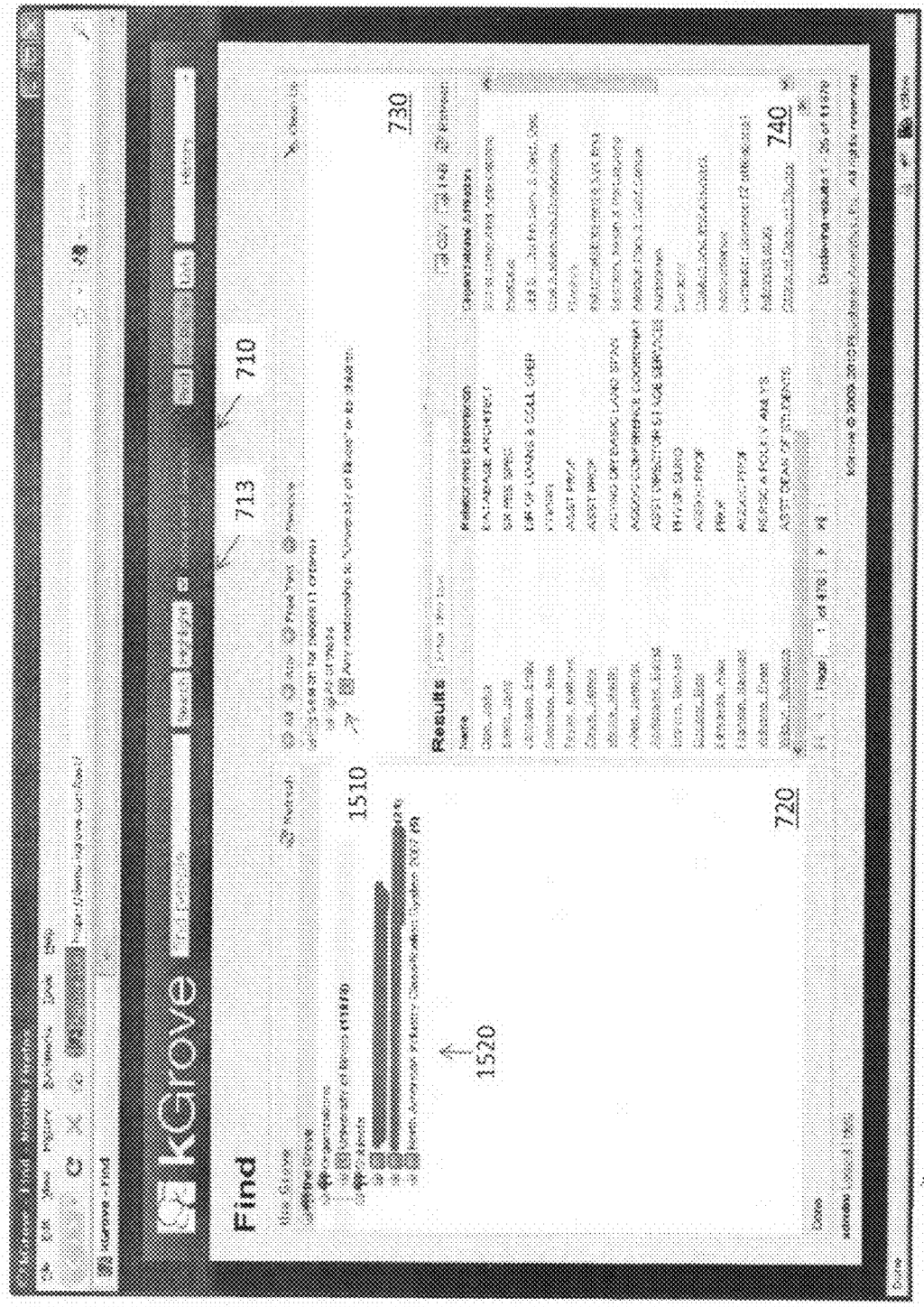

FIG. 16 illustrates the GUI 700 where the data element 1510 is dropped into the search critical tree area 730 and the search query is executed. The results from the search query are displayed in the results area 740.

Figure 17:
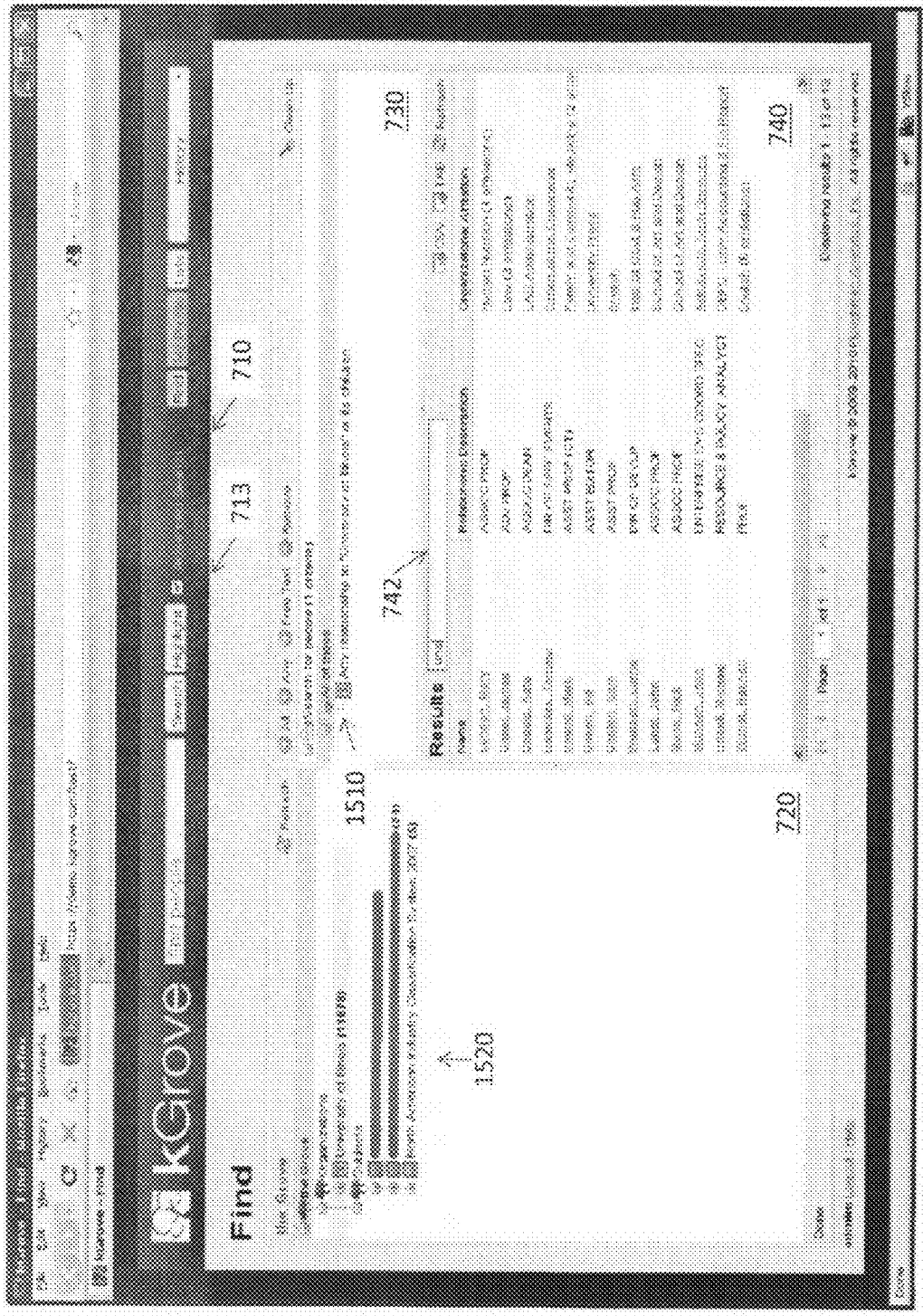

FIG. 17 illustrates the GUI 700 where a filter text box 742 in the results area 740 allows a user to enter text for filtering the results of a search query displayed in the search results area 740. In this example, only results with "uns" are shown in response to the filtering.

Figure 18:
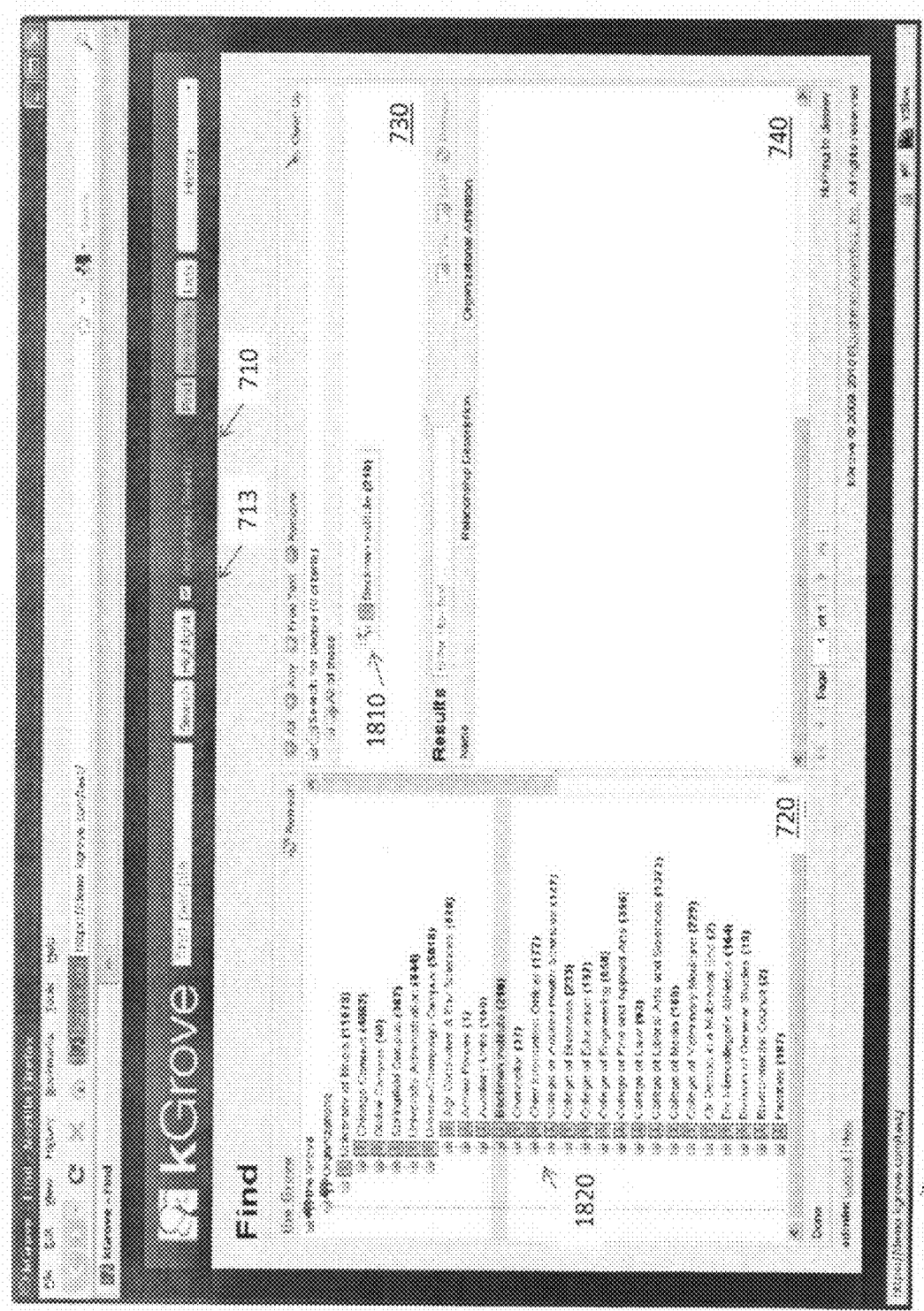

FIG. 18 illustrates the GUI 700 where a data element 1810 from a hierarchical tree structure (multi-level hierarchical tree structure) 1820 in the hierarchical tree area 720 is selected and dragged into the search criteria tree area 730.

Figure 19:
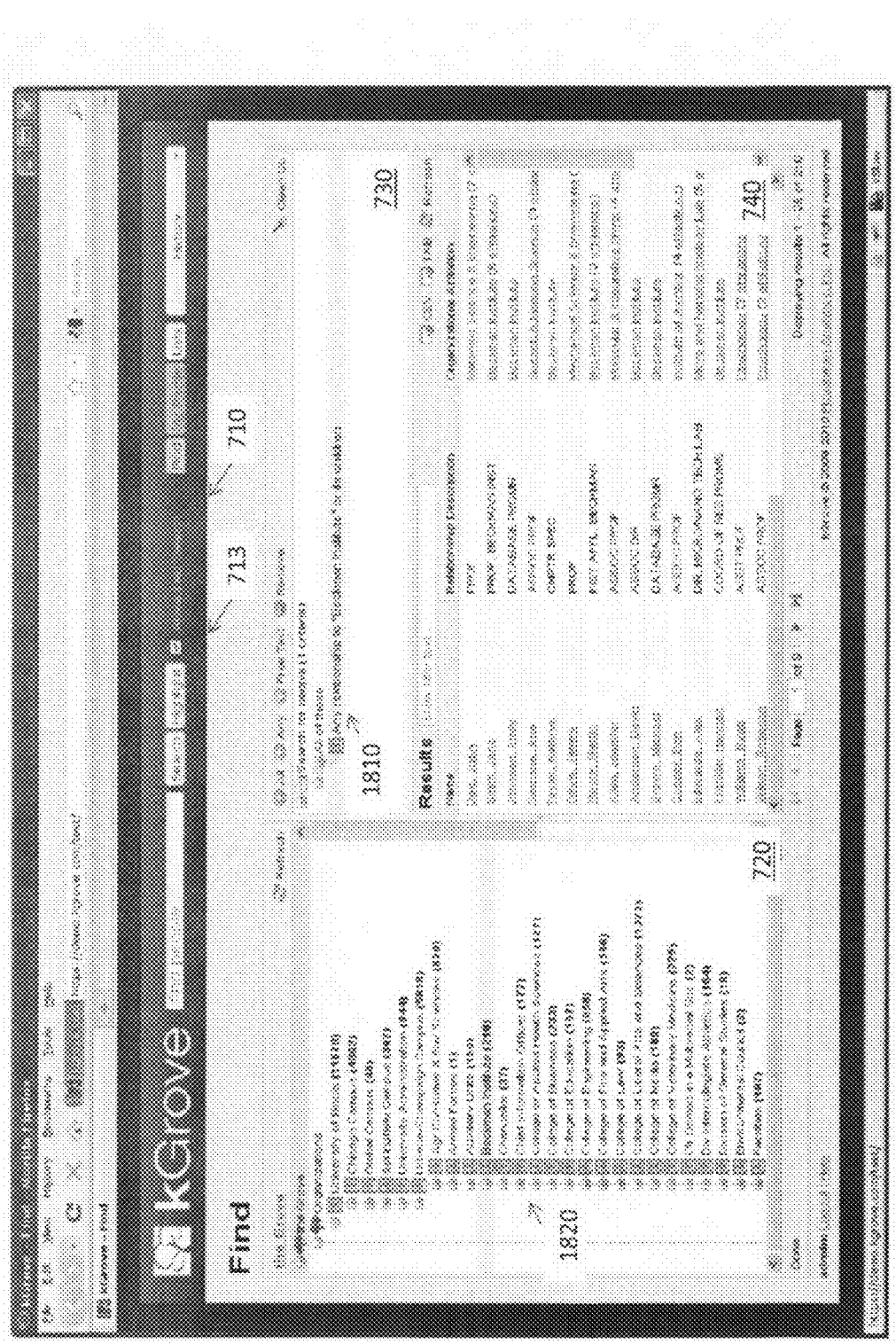

FIG. 19 illustrates the GUI 700 where the data element 1810 is dropped into the search critical tree area 730 and the search query is executed. The results from the search query are displayed in the results area 740.

Figure 20:
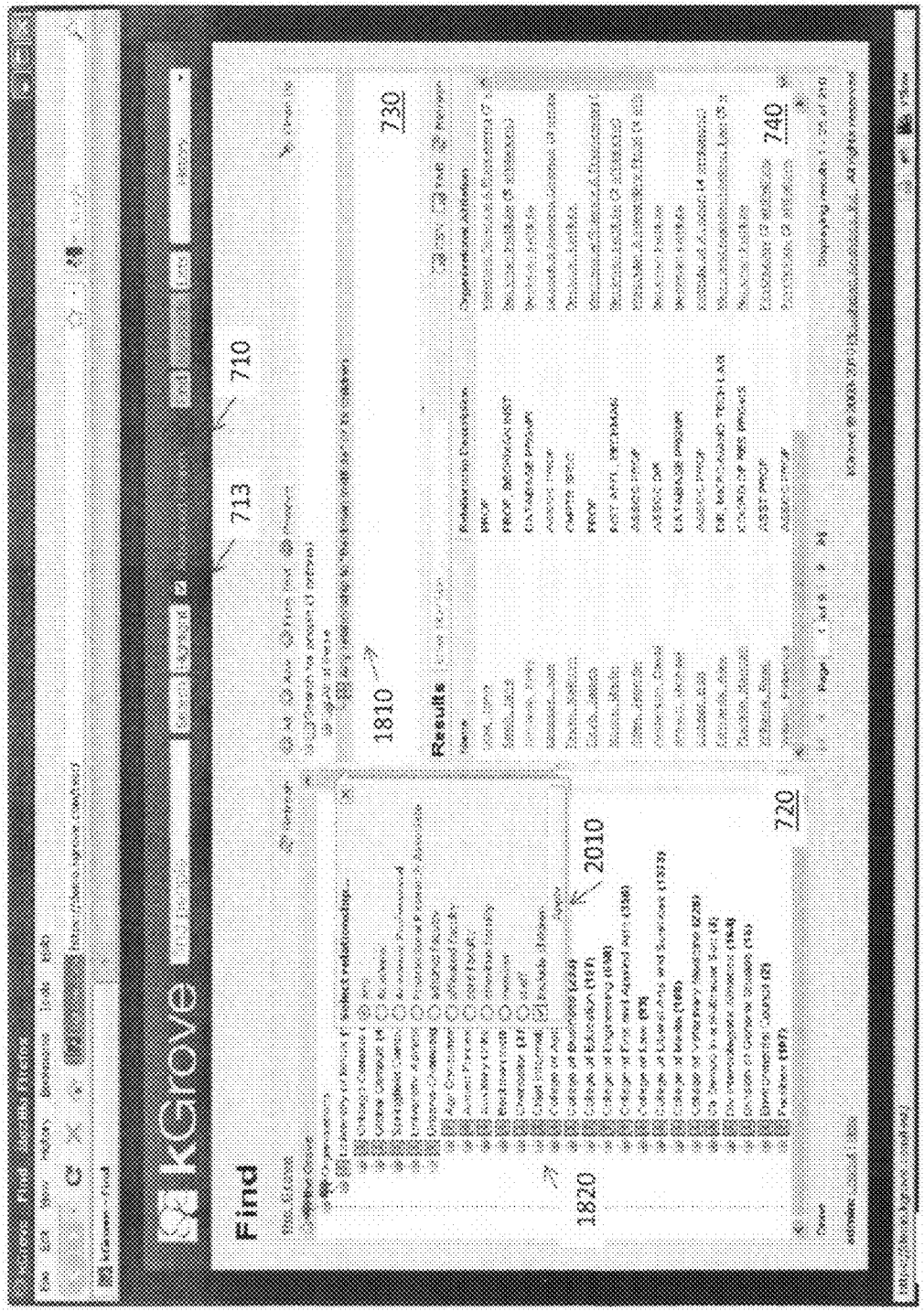

FIG. 20 illustrates the GUI 700 where in response to the user selecting the data element 1810 in the search criteria tree area 730, a window 2010 is generated that provides the user an opportunity to modify the scope of the search query by providing the user with selectable options to further define how the data element 1810 is to be used as a search criterion.

Figure 21:
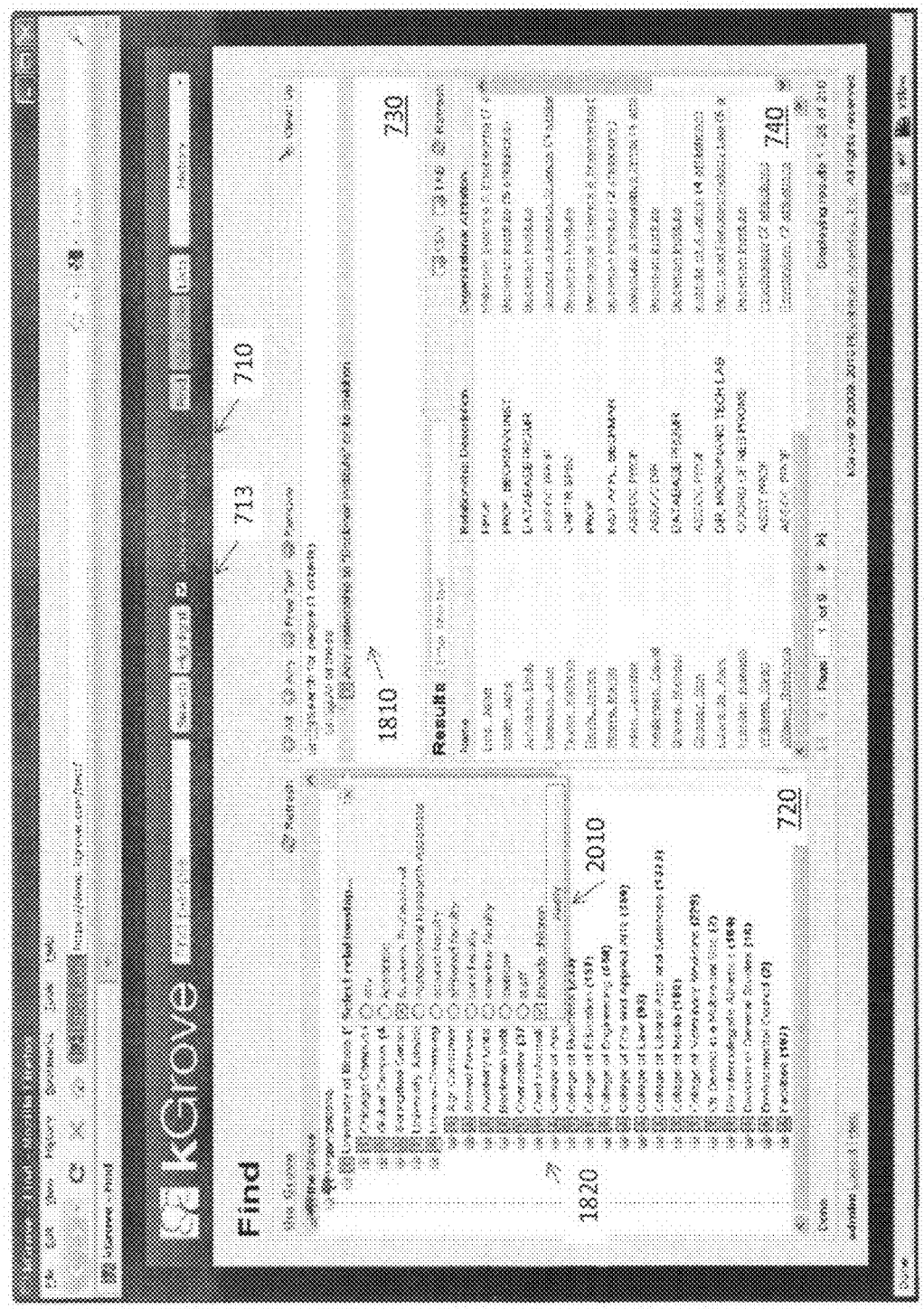

FIG. 21 illustrates the GUI 700 where the user selects the "Academic Professional" relationship to the "Beckman Institute" instead of the default "any" relationship to the "Beckman Institute" from the window 2010.

Figure 22:
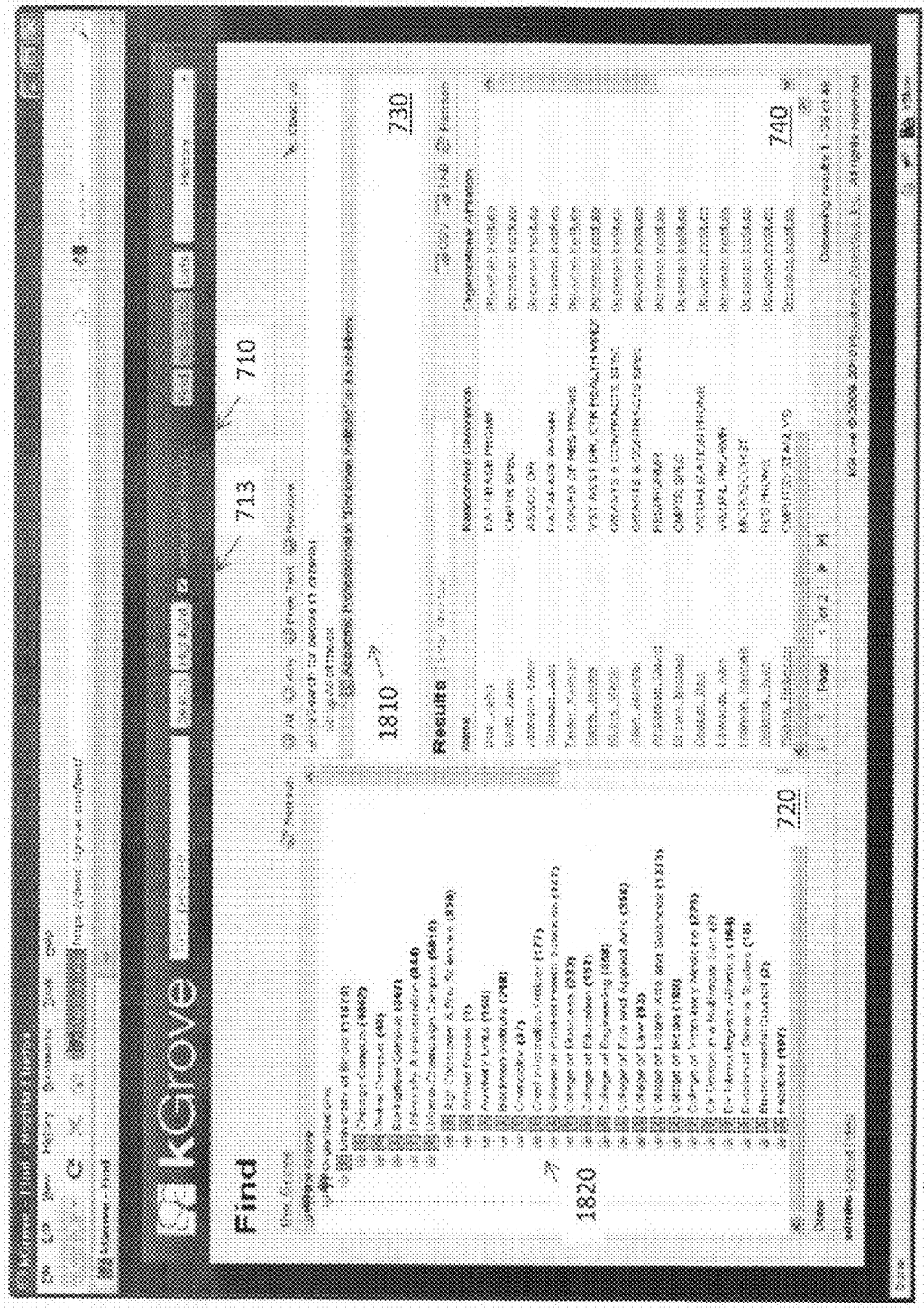

FIG. 22 illustrates the GUI 700 where the results of the executed modified search query are displayed in the results area 740.

Figure 23:
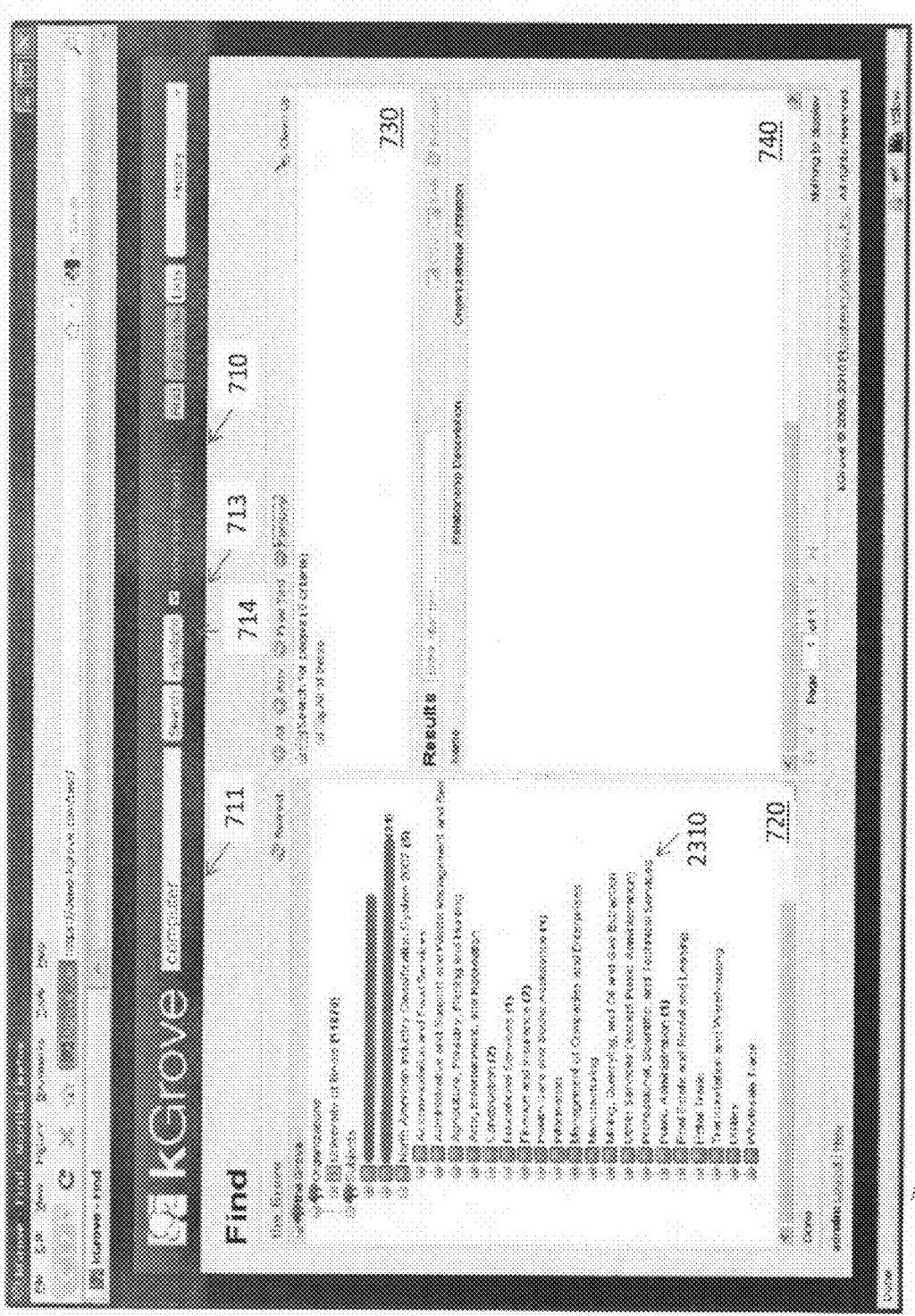

FIG. 23 illustrates the GUI 700 where a user has entered text into the search box 711 in the search term entry area 710. By selecting the highlight button 714, the GUI finds and highlights all instances of the text within a hierarchical tree structure 2310 in the hierarchical tree area 720.

Figure 24:
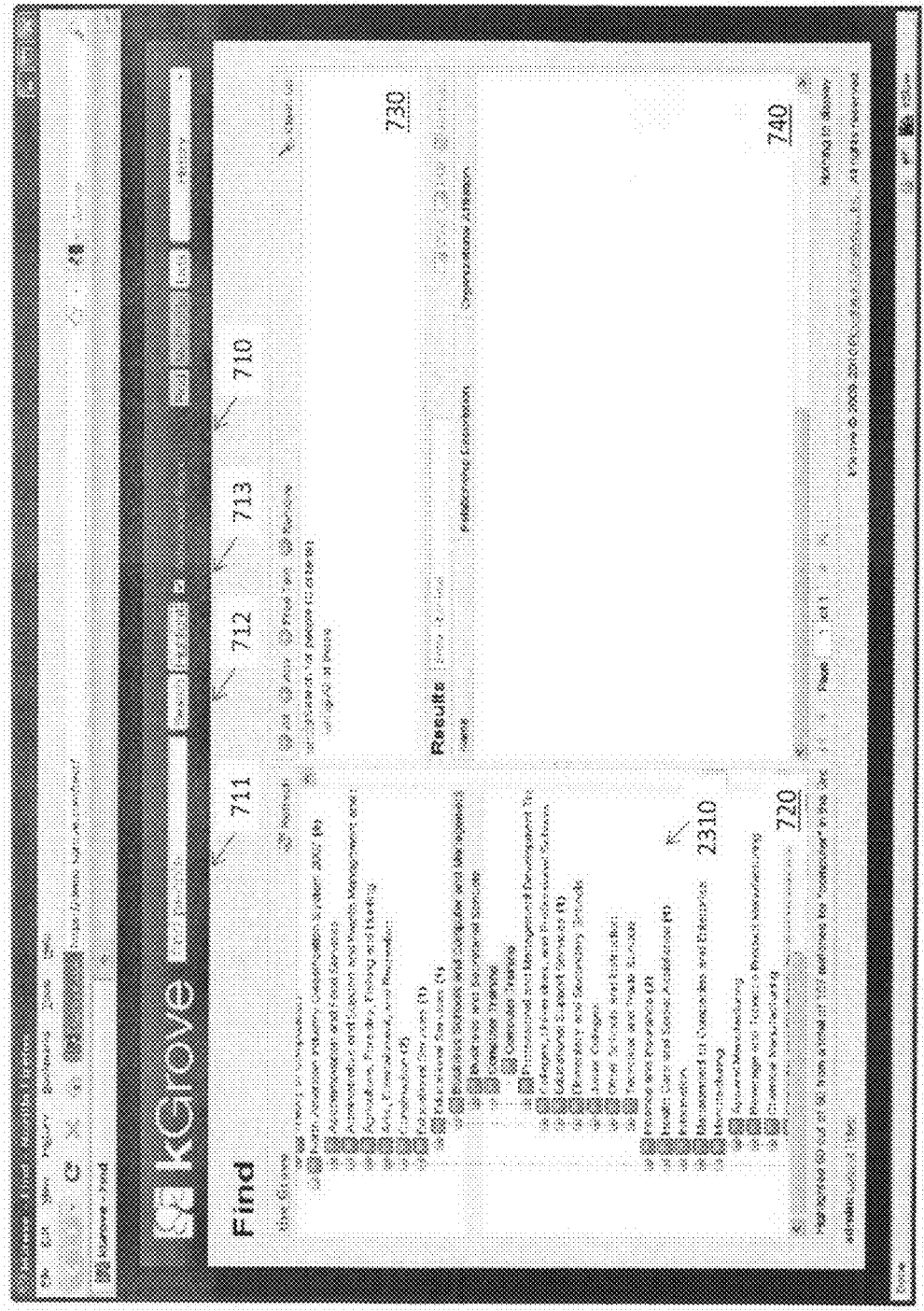

FIG. 24 illustrates the GUI 700 where all data elements in the hierarchical tree structure having a label with the text "computer" are highlighted with the tree structure expanded to display these data elements. Any of the data elements in the hierarchical tree area 720 may be selected and moved to the search criteria tree area 730 to compose a subsequent search.

Figure 25:
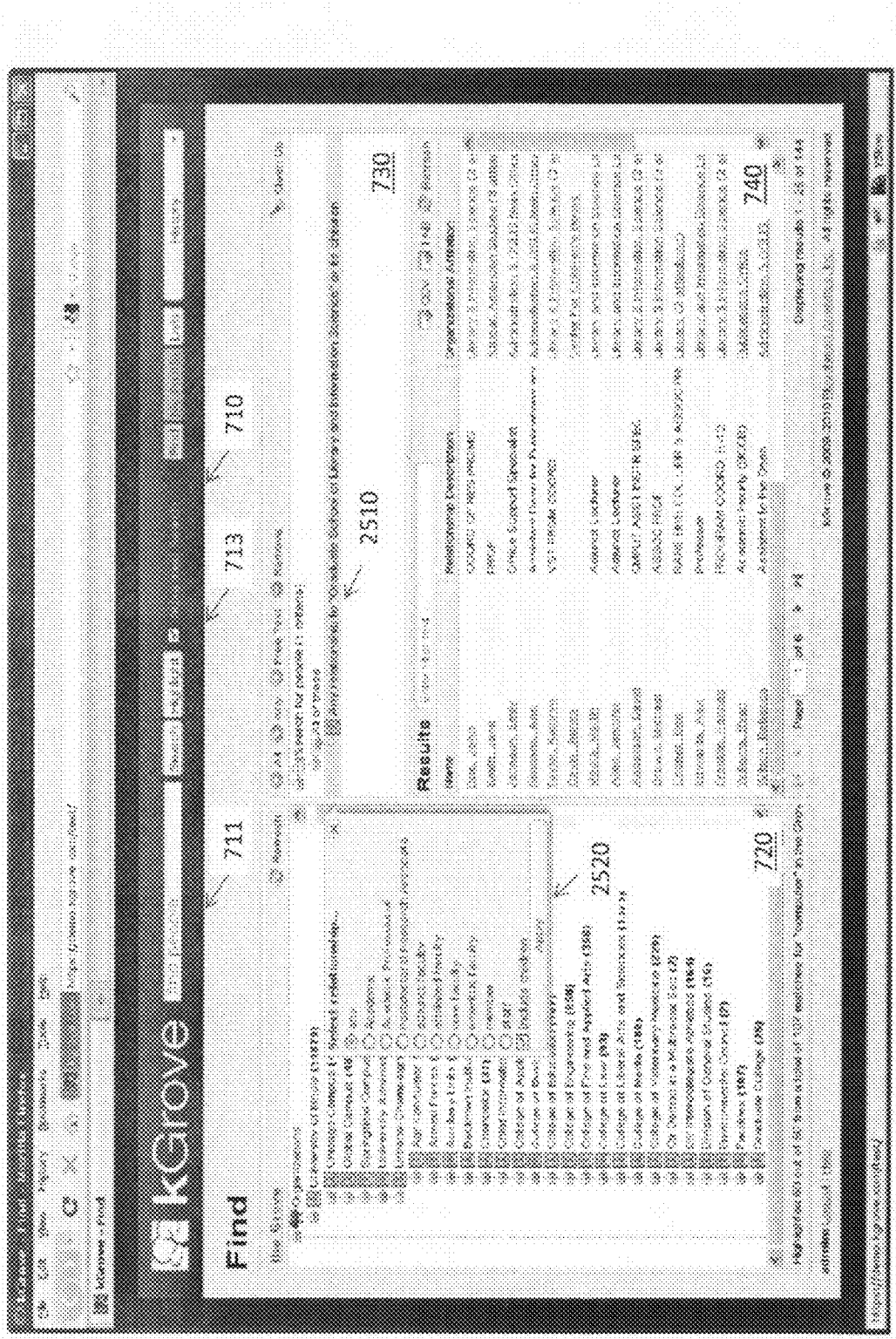

FIG. 25 illustrates the GUI 700 where in response to the user selecting the data element 2510 in the search criteria tree area 730, a window 2520 is generated that provides the user an opportunity to modify a scope of the search query by providing the user with selectable options to further define how the data element 2510 is to be used as a search criterion. In this example the user wishes to see profiles matching the "Graduate School of Library and Information Sciences" (GSLIS) or its children. That is, the user wishes to identify someone who is related to an entity that is "below" GSLIS in the hierarchical tree structure. For example, a profile for someone in the Admissions department of GSLIS might be the desired piece of information.

Figure 26:
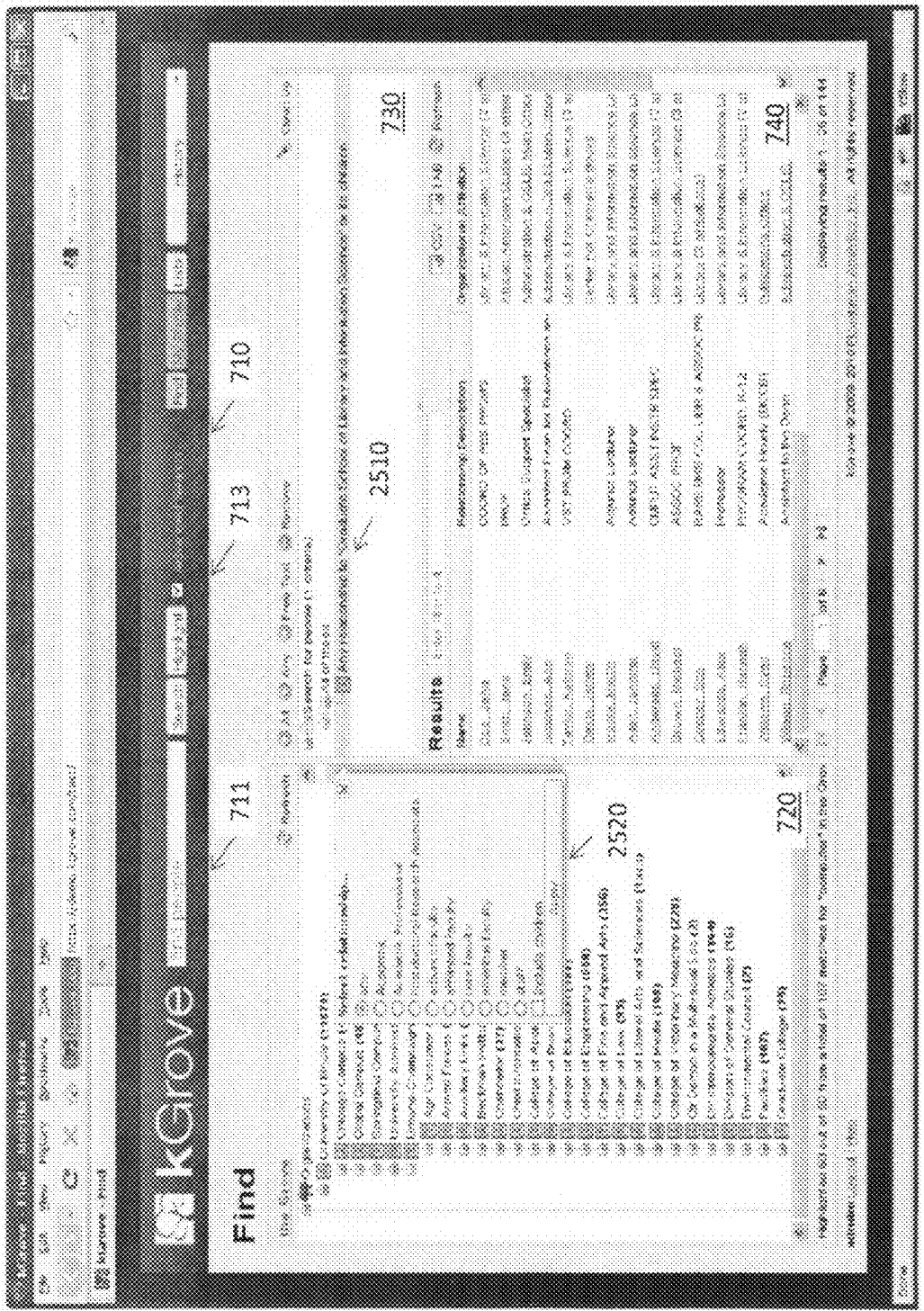

FIG. 26 illustrates the GUI 700 where the user unselects the "Include children" option in window 2520. In this example, the user is only interested in profiles that match exactly the criteria element, but not elements below it in the hierarchical tree structure.

Figure 27:
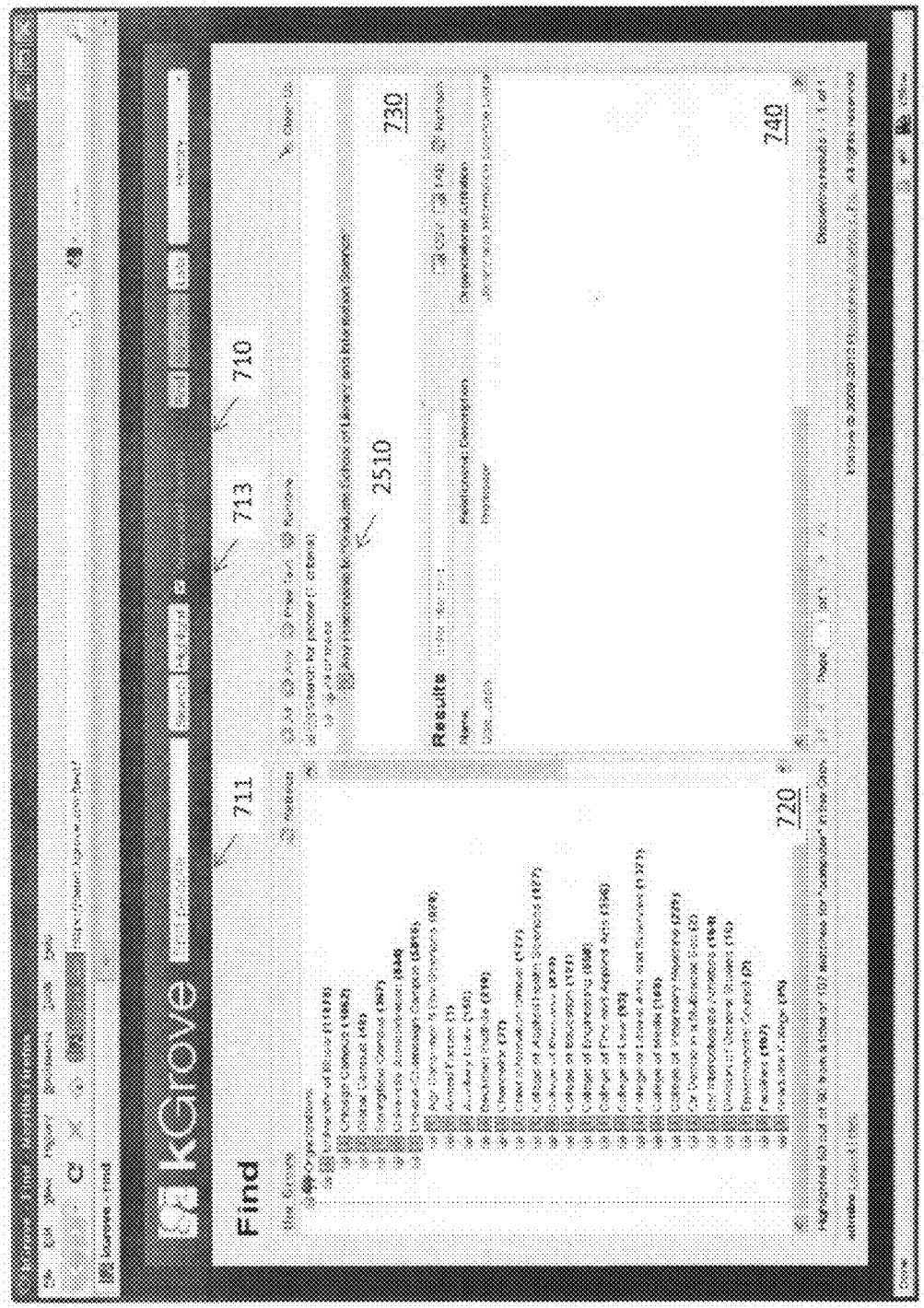

FIG. 27 illustrates the GUI 700 with the search results shown in the results area 740 in response to the modifications made to the data element 2510 in the search criteria tree area 730.

Figure 28:
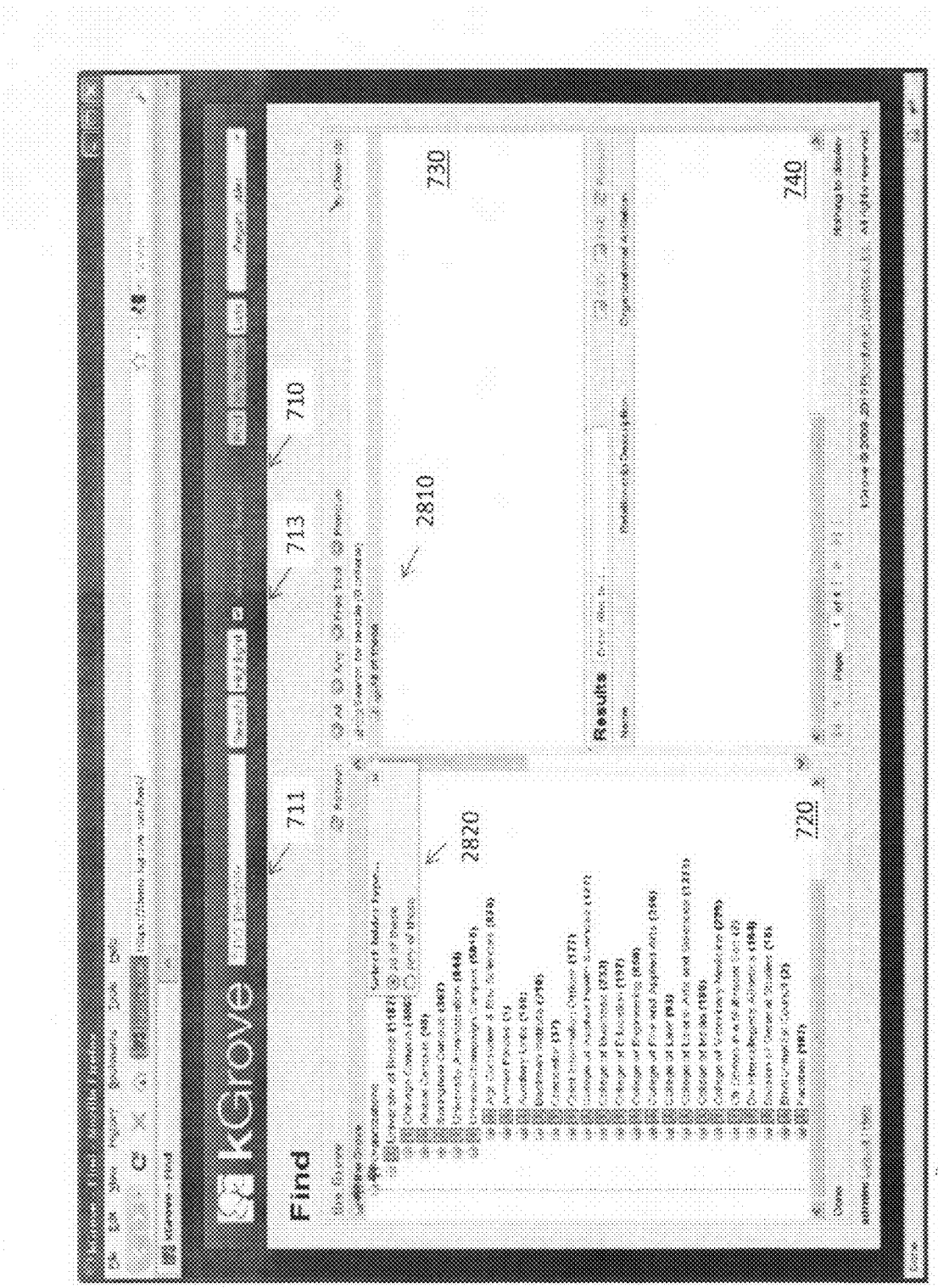

FIG. 28 illustrates the GUI 700 where a grouping folder 2810 in the search criteria tree area 730 is selected. In response to the selection, a window 2820 is generated that allows the user to select or modify the grouping folder 2810 to effectuate a desired Boolean operation. In this example, the user is given the option to select "All of these" which performs an "AND" function or "Any of these" which performs an "OR" function.

Figure 29:

FIG. 29 illustrates the GUI 700 where the grouping folder 2810 is changed to "Any of these" which performs an "OR" function.

Figure 30:
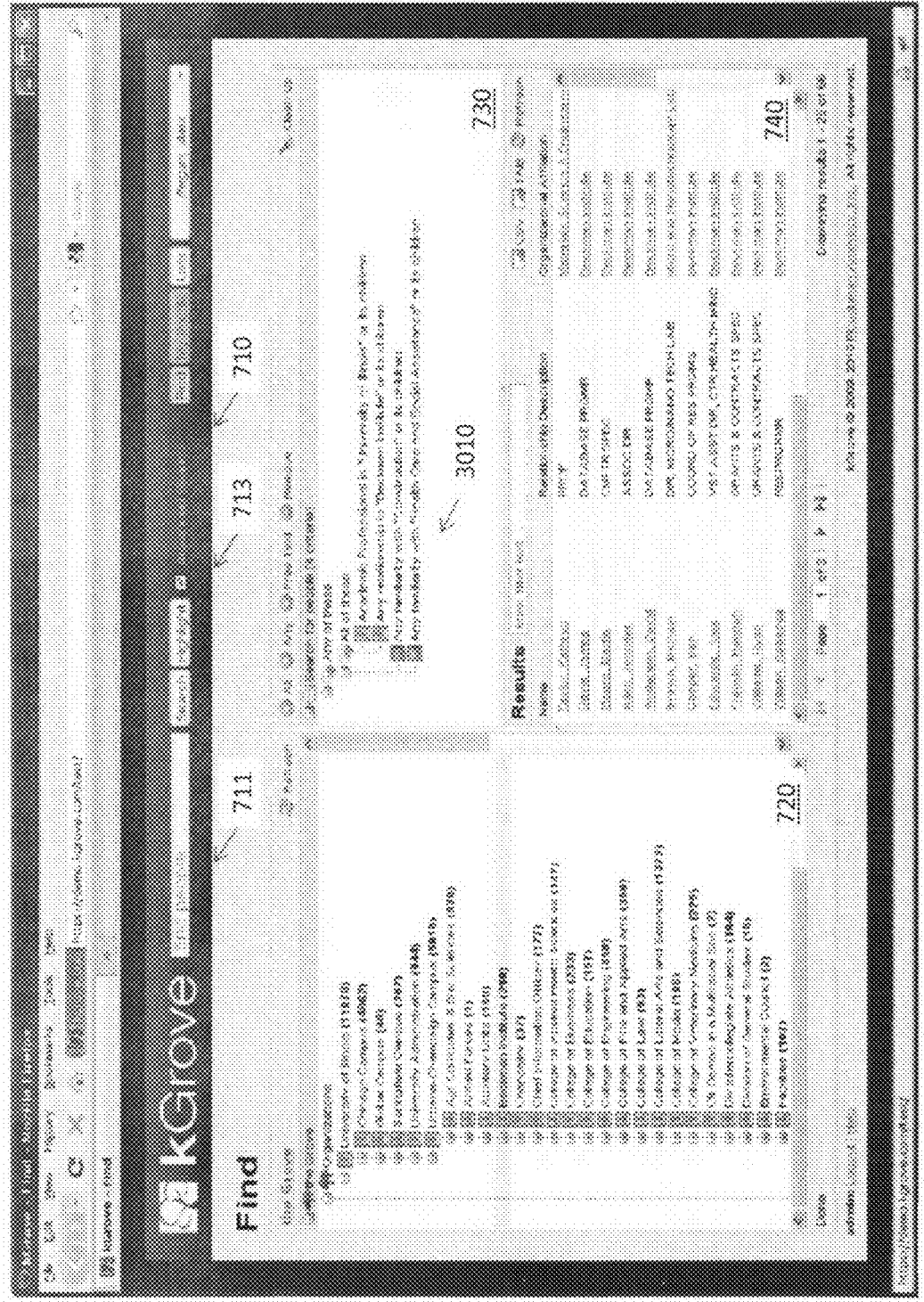

FIG. 30 illustrates the GUI 700 where a plurality of grouping folders and data elements are entered in the search criteria tree area 730 to formulate a complex Boolean search query 3010. In this example, the search query 3010 includes an "Any of these" (equivalent to an "OR") containing three criteria:

1) An "All of these" (equivalent to an "AND") requiring the resulting profile have an "Academic Professional" relationship to the University of Illinois or any entity below the University of Illinois in the hierarchy and some relationship to the Beckman Institute
    OR
2) Any familiarity with the topic of "Construction" or subordinate topics
    OR
3) Any familiarity with the topic of "Health Care and Social Assistance" or topics subordinate to it.

Figure 31:
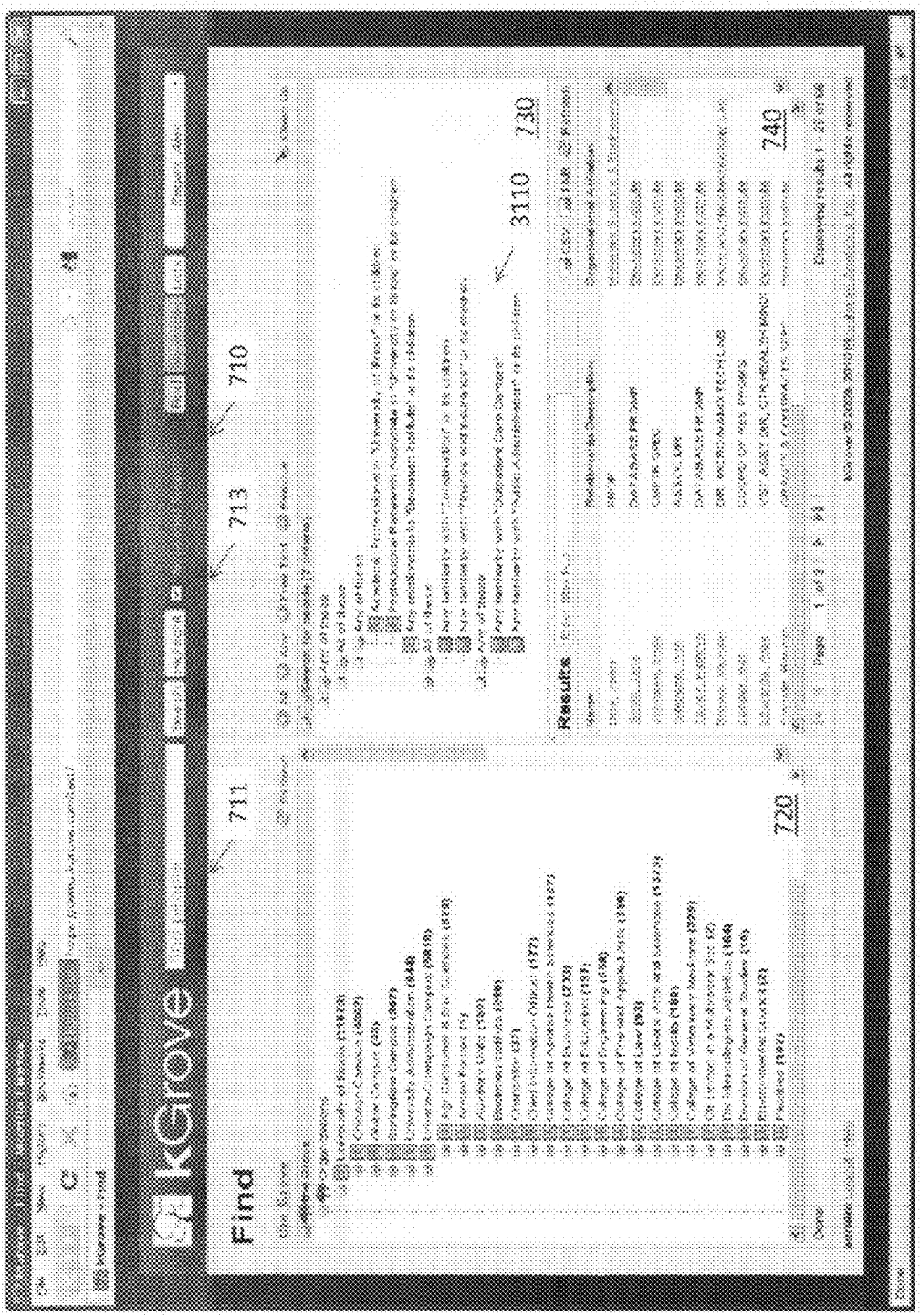

FIG. 31 illustrates the GUI 700 where a plurality of grouping folders and data elements are entered in the search criteria tree area 730 to formulate another complex Boolean search query 3110. In this example, the search query 3110 includes multiple levels of nesting.

The criteria read as follows:

A profile matching any of the following three criteria should be returned:

1) Any relationship to the Beckman Institute or its subordinate entities
    AND
        EITHER
            have an "Academic Professional" relationship to the University of Illinois or one of its subordinate entities

OR

A "Postdoctoral Research Associate" relationship to the University of Illinois or one of its subordinate entities.

OR

2) BOTH of these:

Any familiarity with the topic of "Construction" or subordinate topics

AND

Any familiarity with the topic of "Finance and Insurance" or topics subordinate to it.

OR

3) At least one of these:

Any familiarity with the topic of "Outpatient Care Centers" (only; do not check the subordinate topics)

OR

Any familiarity with the topic of "Public Administration" or topics subordinate to it.

The set of complex, nested criteria formulated in the search query 3110 illustrates both the flexibility and robustness of the searching function supported by the search criteria tree area 730.

Figure 32:
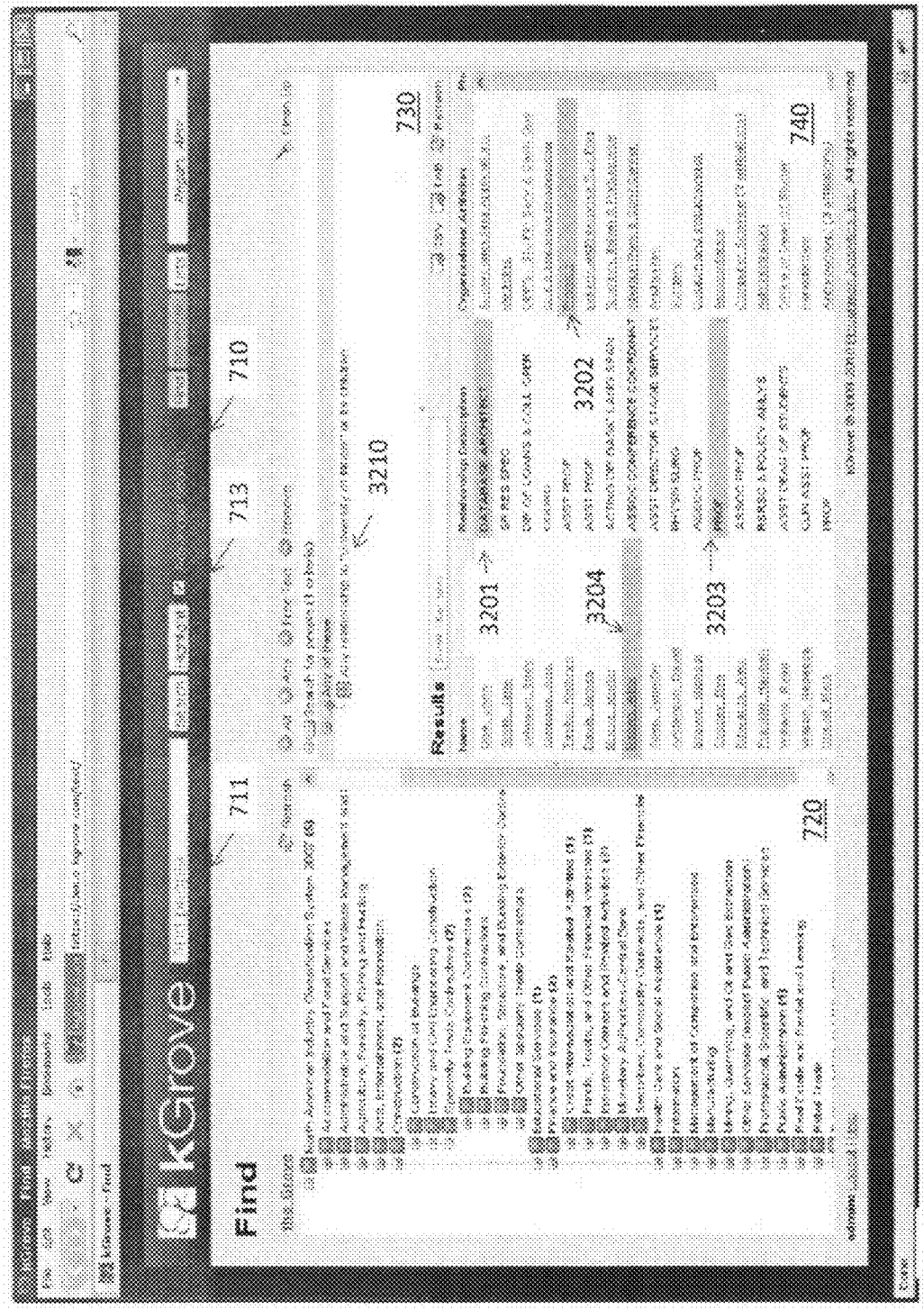

FIG. 32 illustrates GUI 700 displaying results in the results area 740. The results reflect the search query 3210 entered in the search criteria tree area 730. As shown, a plurality of individual result fields 3201-3204 is selected. Upon selection, the user may move the selected results into the search criteria tree area 730. By moving the results 3201-3204 from the results area 730 into the in the search criteria tree area, the search query may be modified, enabling the user to iterate and refine the search.

Figure 33:
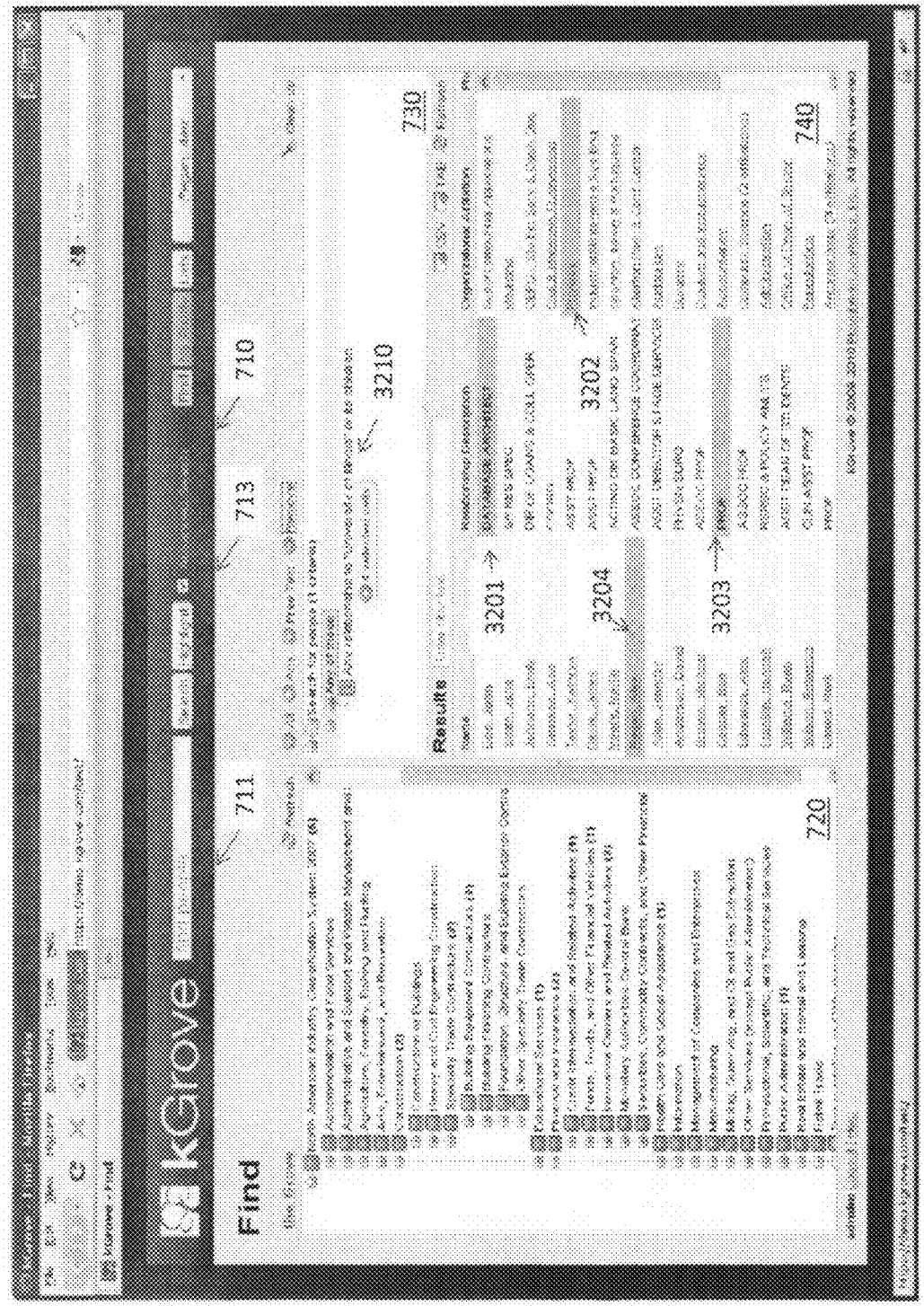

FIG. 33 illustrates the user dragging the 4 selected cells from the results area 740 to the search criteria tree area 730.

Figure 34:
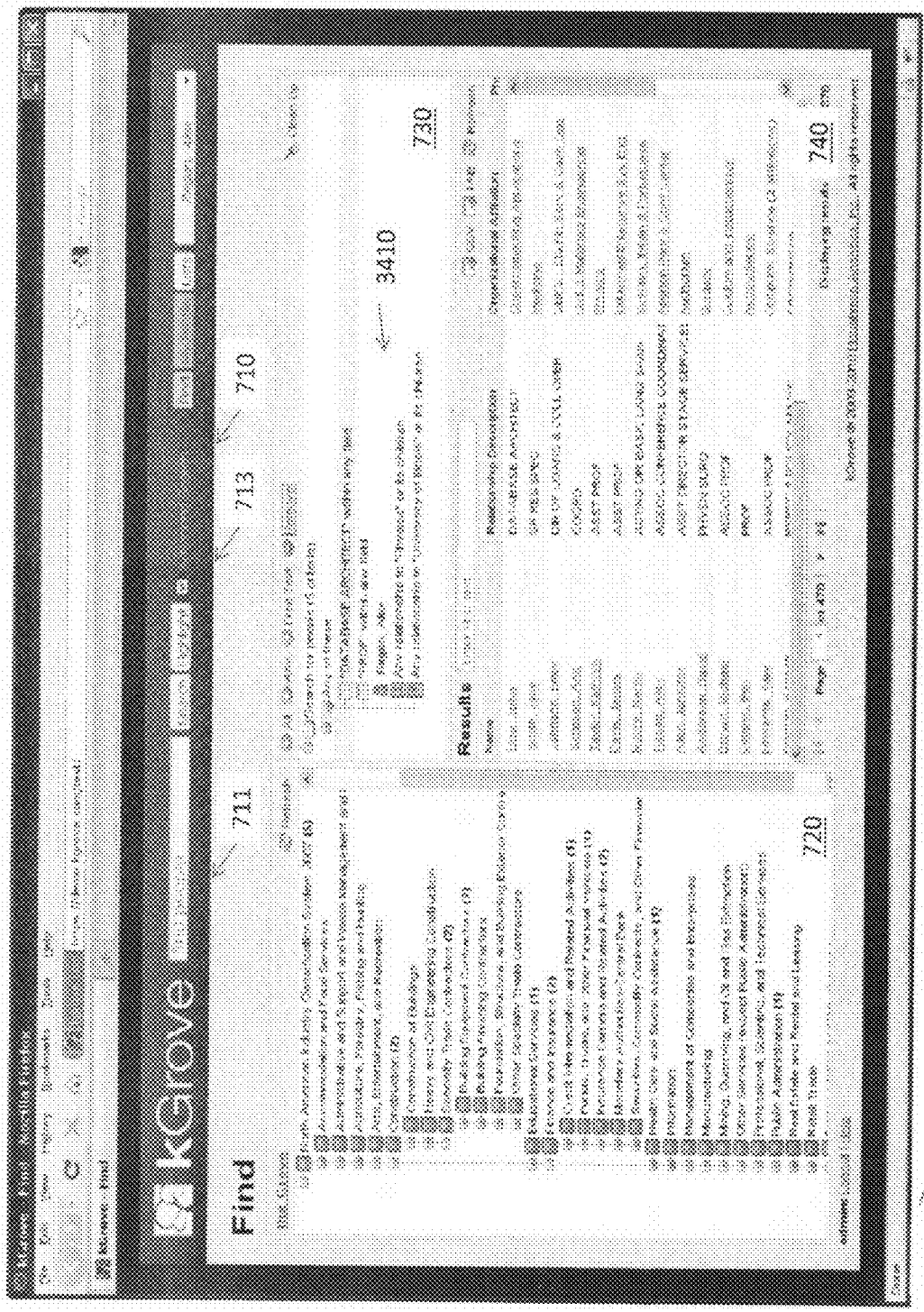

FIG. 34 illustrates the GUI 700 with the results 3201-3204 added as criteria in the modified search query 3410 in the search criteria tree area 730. The result area 740 displays the results of the modified search query 3410.

Figure 35:
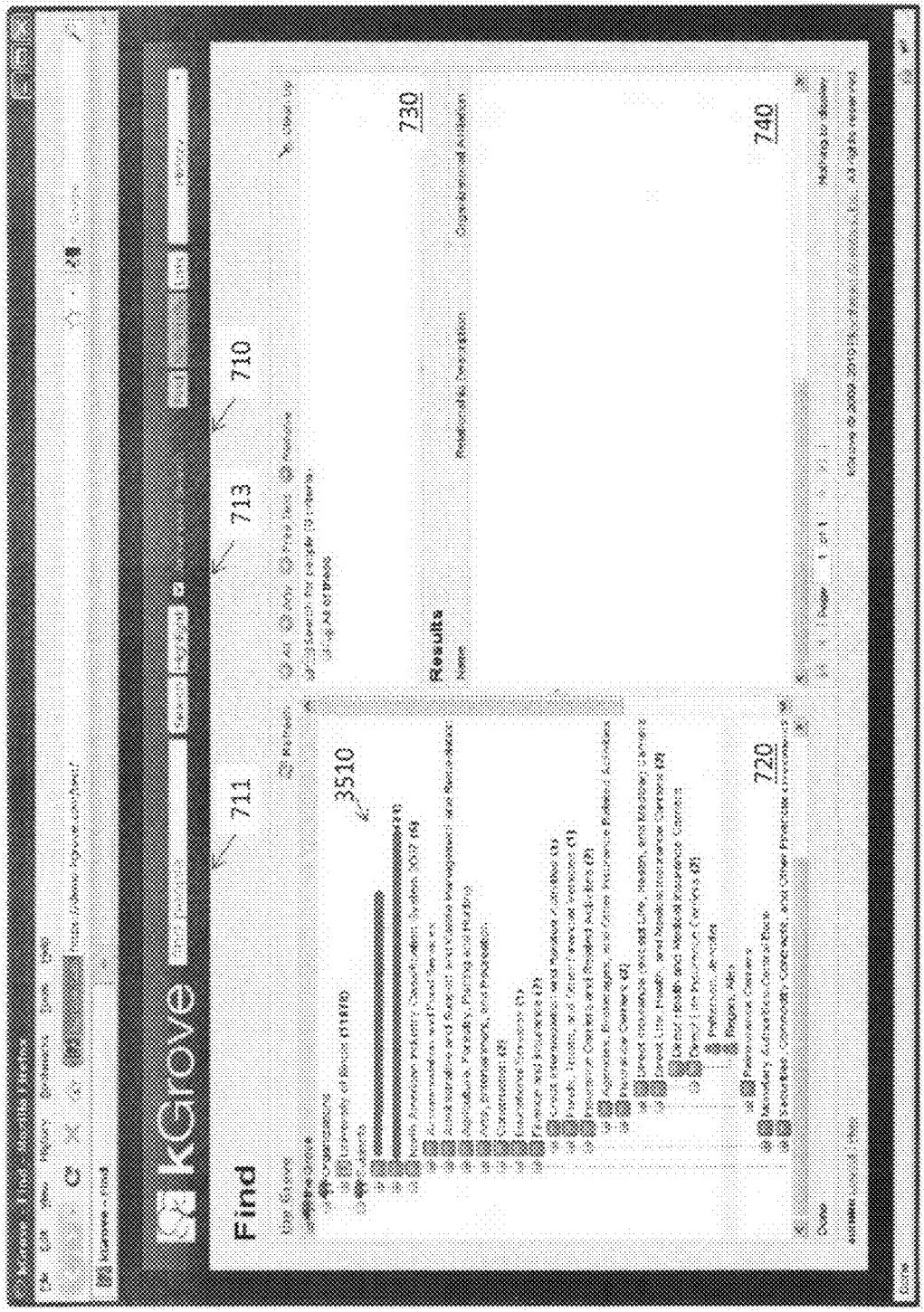
FIGS. 35-47 illustrate exemplary features of a GUI that allow for data editing and search and discovery according to embodiments of the present invention.

FIG. 35 illustrates the GUI 700 with a hierarchical tree structure 3510 having a plurality of levels. A user may browse down the hierarchical tree structure 3510 to find the data of interest. In this example, the data of interest is a person, "Alex Regan". The data element associated with "Alex Regan" may be selected to navigate the user to a profile page showing information about that person.

Figure 36:
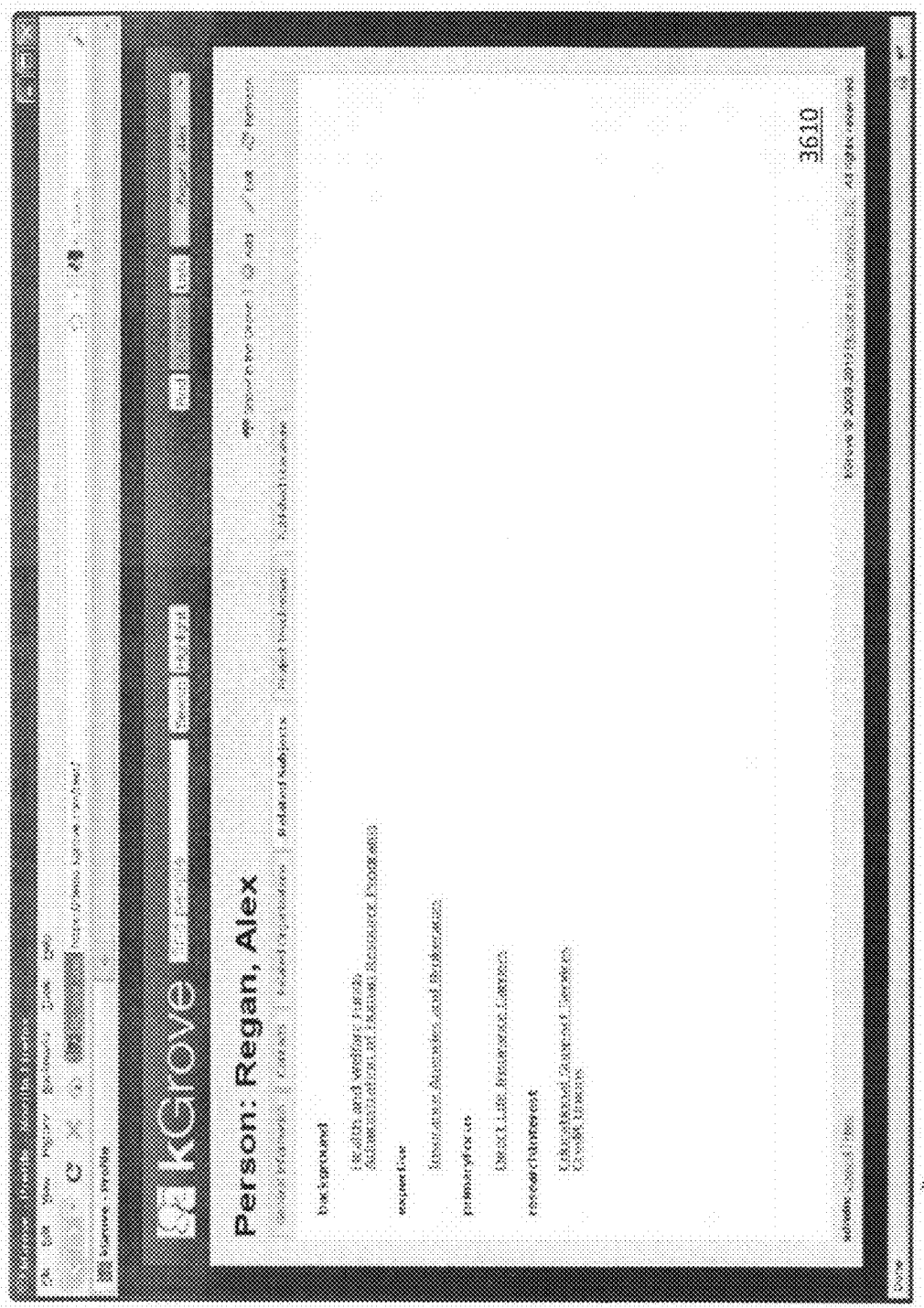

FIG. 36 illustrates a GUI 3600 that provides a general profile area 3610 for the matter "Alex Regan".

Figure 37:
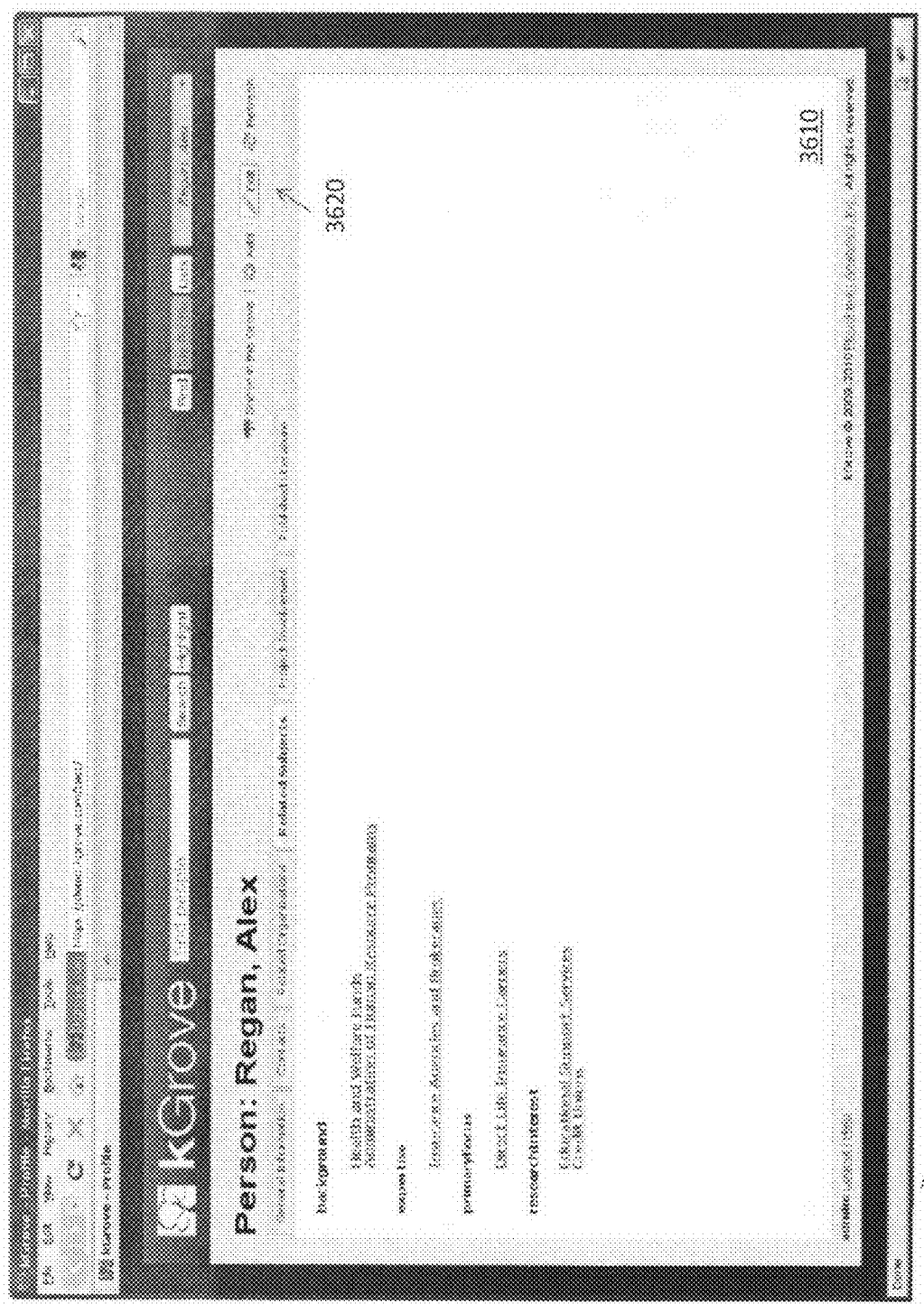

FIG. 37 illustrate the GUI 3600 with an edit button 3610 which has been selected. By selecting the edit button 3610, a user may make changes to data associated with the profile.

Figure 38:
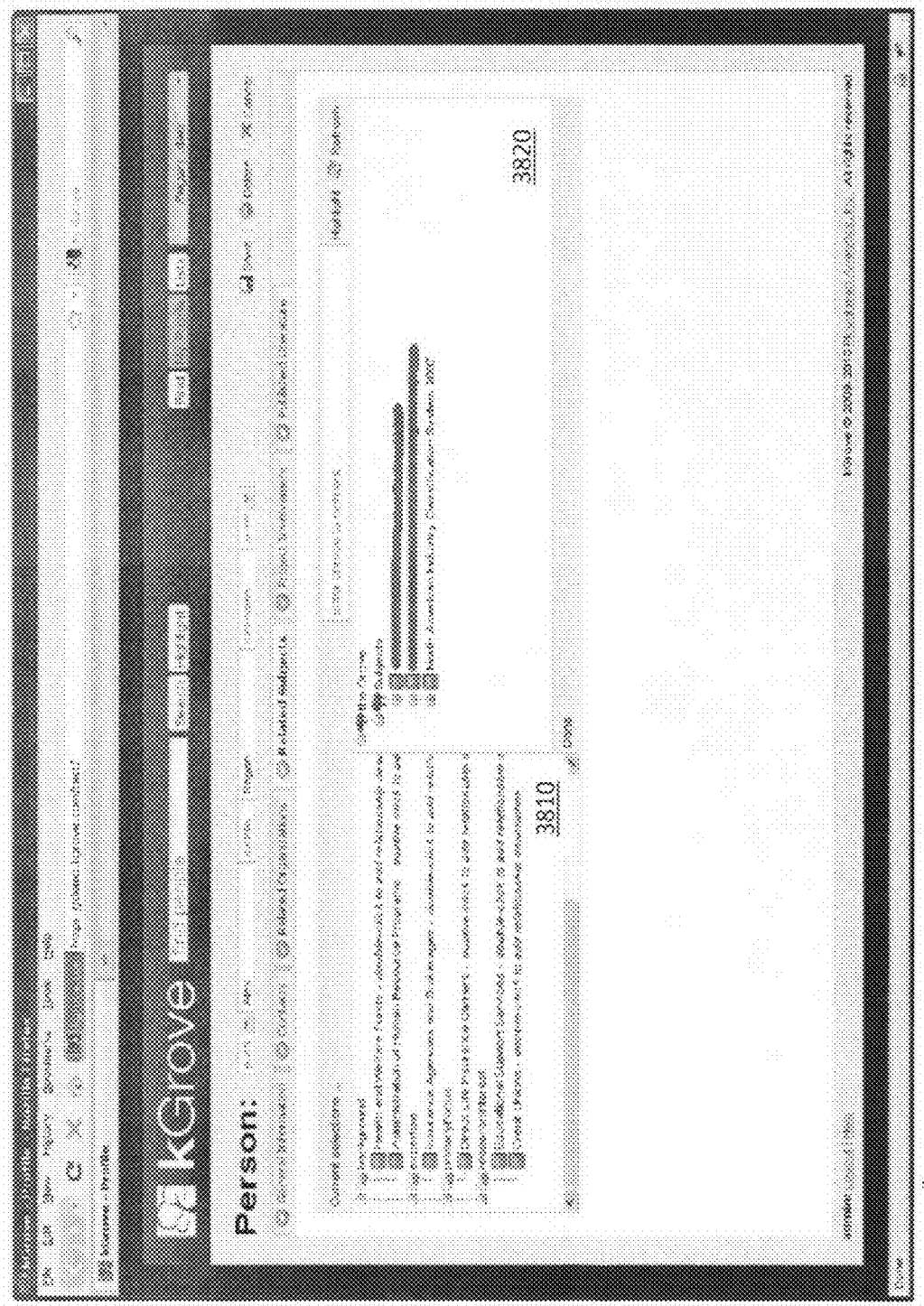

FIG. 38 illustrates a GUI 3800 that provides edit features to a profile. The GUI 3800 includes an information area 3810 operable to display information associated with a matter. The GUI 3800 also includes a hierarchical tree area 3820 operable to display data elements in a multi-level hierarchical tree structure, wherein the data elements are representative of searchable data in a database. According to an embodiment of the present invention, the information area is operable to allow a user to enter additional information to associate with the matter in response to the user's selection of one or more data elements from the hierarchical tree area.

In this example, the user is editing the "Related Subjects" tab of a person's profile. The information area 3810 displays relationships which have been expressed. In this instance, relationships between a person's profile and subjects can be expressed as "background", "expertise", "primaryFocus", or "researchInterest". The hierarchical tree area 3820 may be similar to the hierarchical tree area 720 described earlier. In this example, the hierarchical tree area 3820 is limited to subjects. The user may perform a search within the hierarchical tree structure to quickly identify and highlight items of interest. Alternatively, the user can browse through the hierarchical tree structure to discover items (data elements) of interest, or go directly to an item if they can identify where it resides in the hierarchical tree structure. The GUI 3800 has the flexibility to support the user's approach, even if the approach changes from interaction to interaction.

Figure 39:
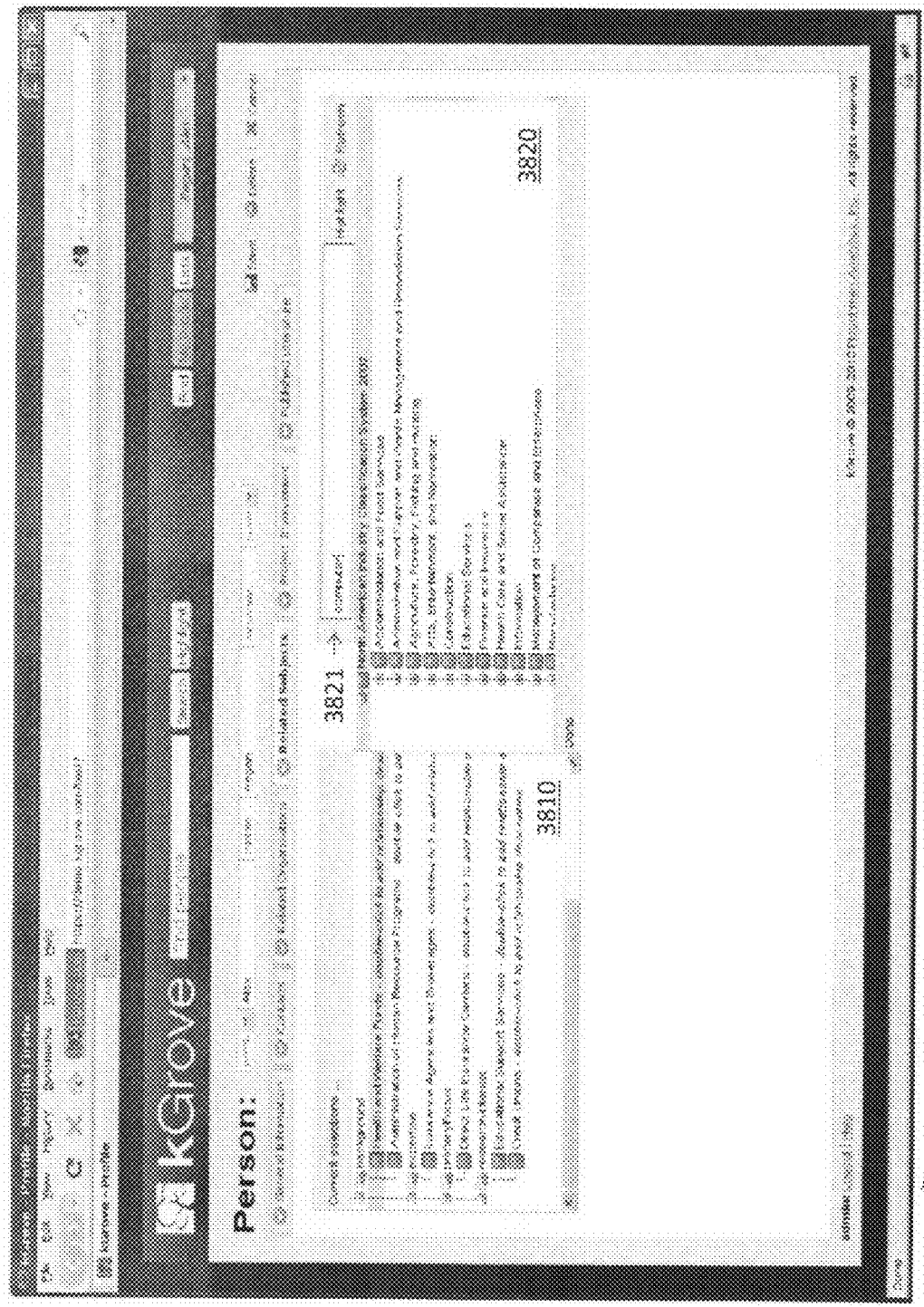

FIG. 39 illustrates the GUI 3800 with a search term entry area 3821 in the hierarchical tree area 3820. A user may enter a search term in the search term entry area 3821 to identify and highlight that search term in the hierarchical tree structure.

Figure 40:
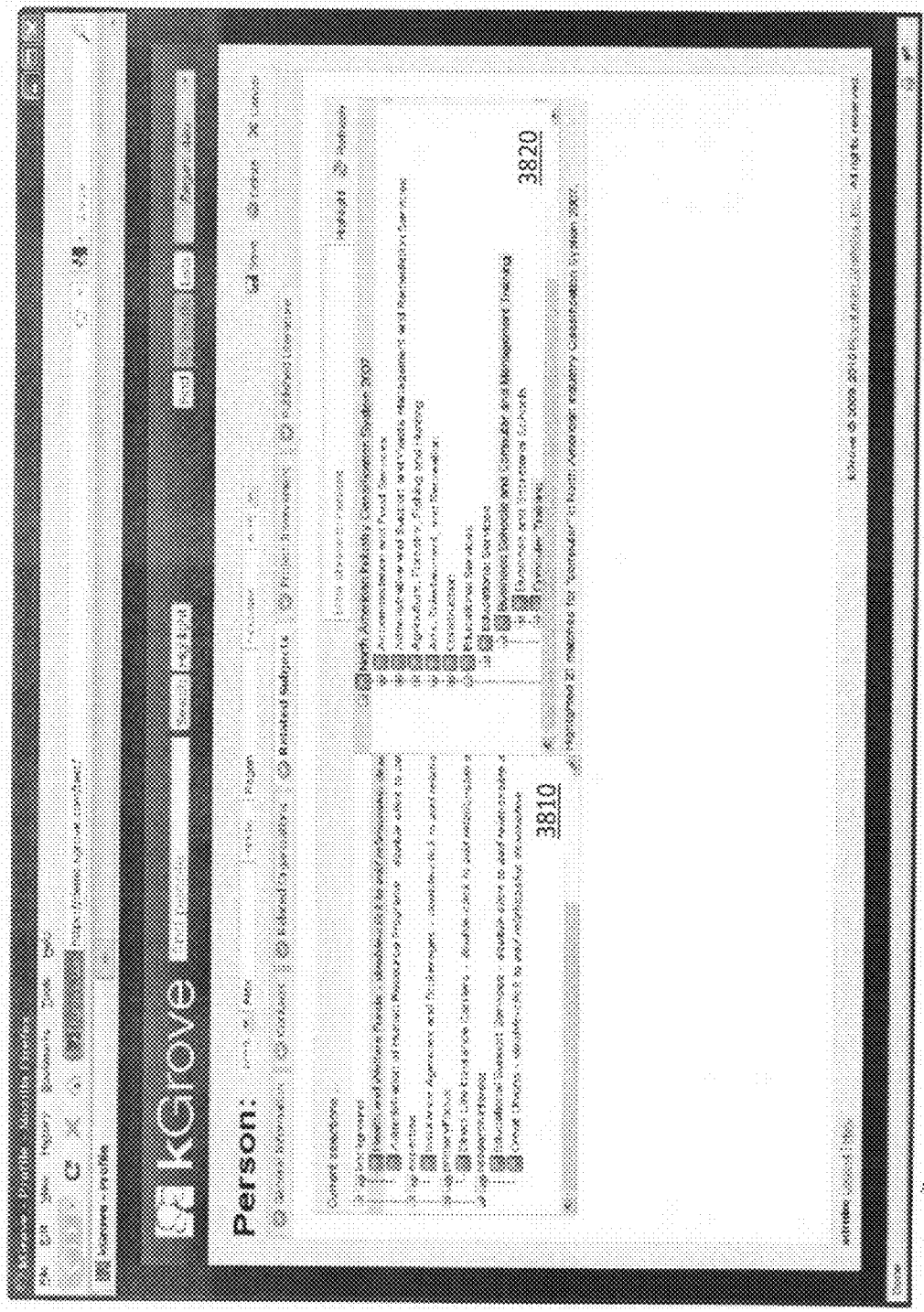

FIG. 40 illustrates the GUI 3800 with the term "computer" highlighted in the hierarchical tree area 3820. As shown, there are 21 matches and 21 data elements highlighted. The first 2 matches are shown in the hierarchical tree area 3820 in FIG. 40.

Figure 41:
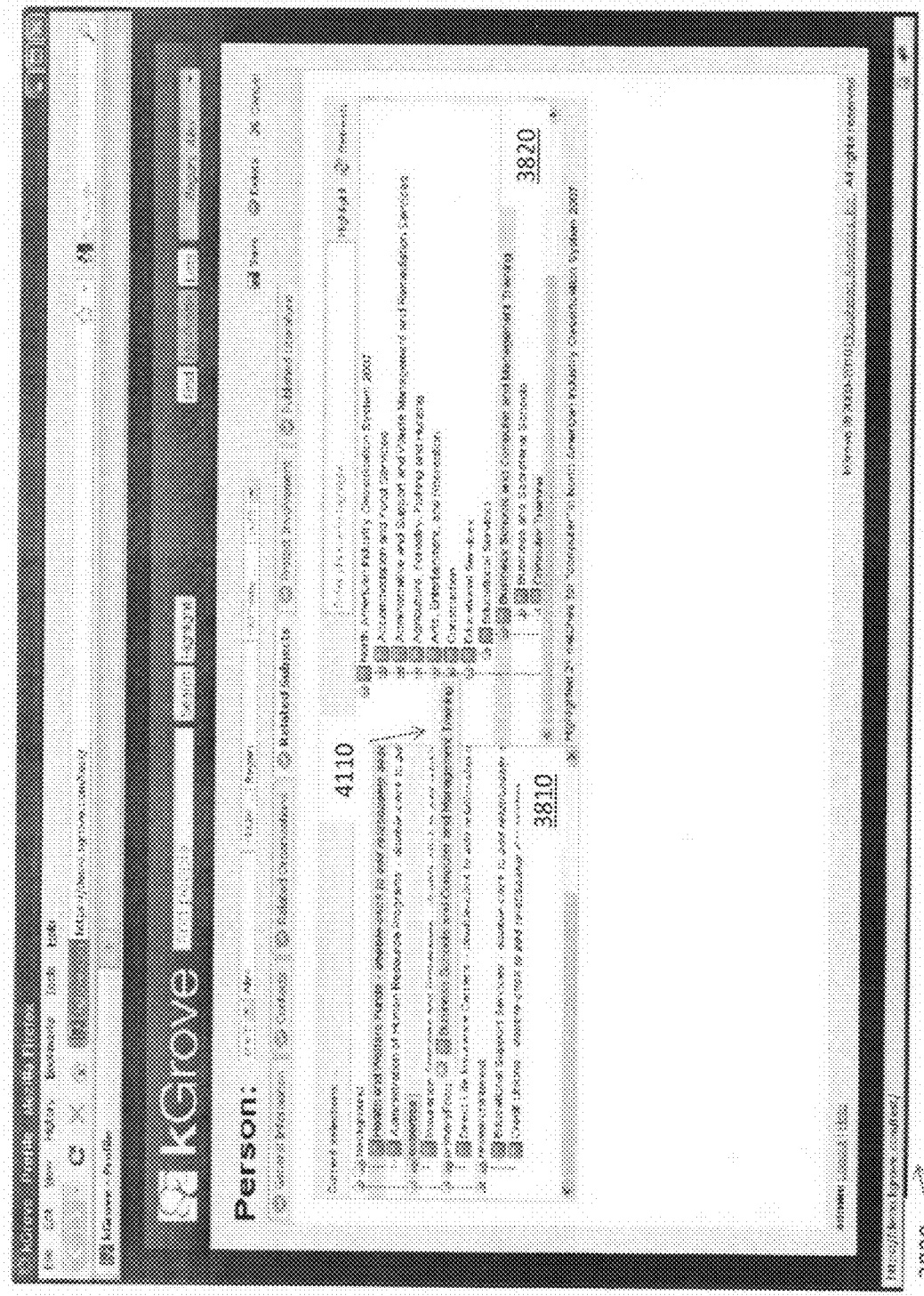

FIG. 41 illustrates the GUI 3800 where a user has selected and is moving one of the highlighted data elements 4110 to the information area 3810 in order to express the relationship of this selected topic to the person's profile. As shown, the user is selecting the topic "Business Schools and Computer and Management Training" and relating it to "expertise" in the person's profile.

Figure 42:
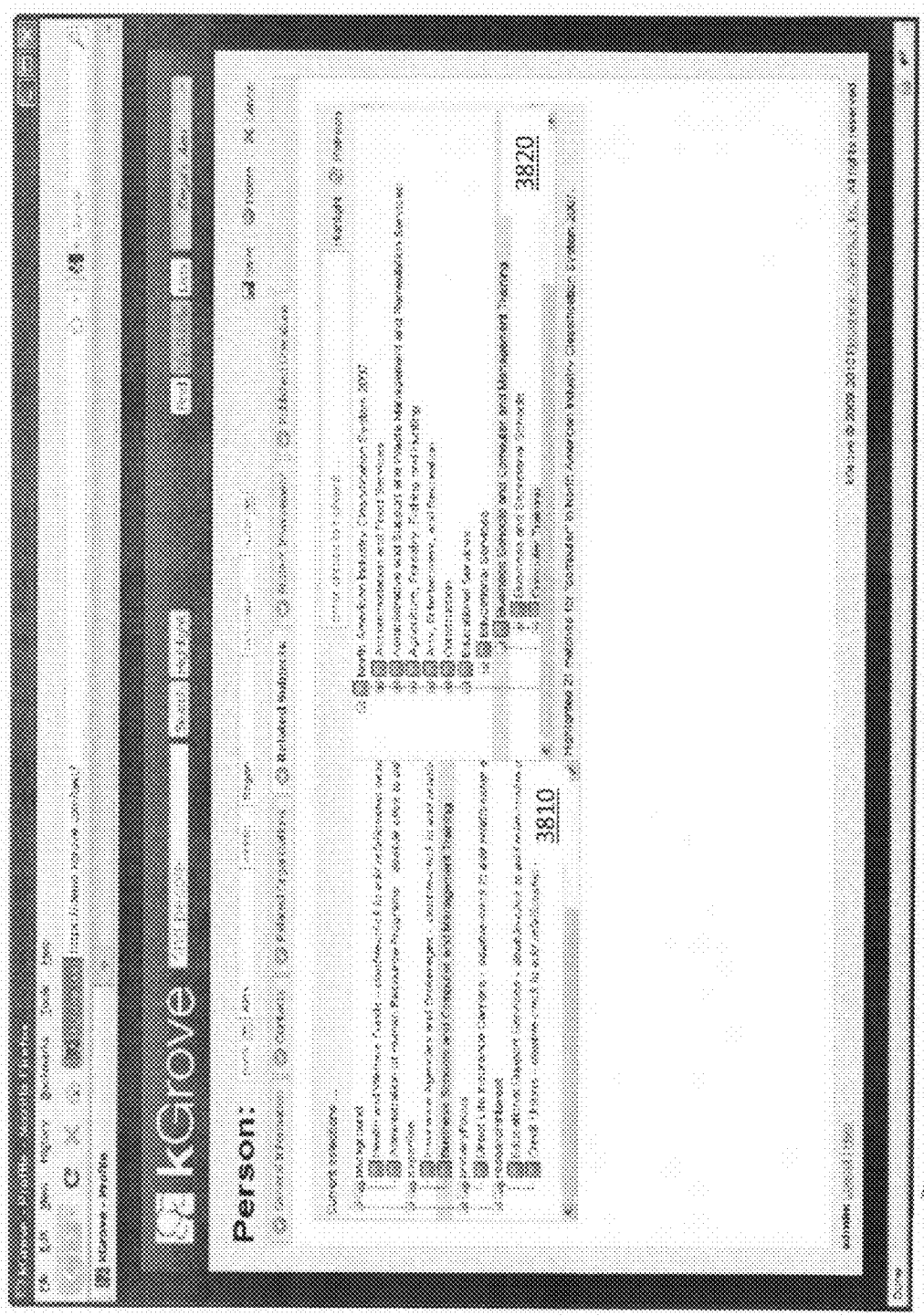

FIG. 42 illustrates the GUI 3800 with the updated information area 3810 having the selected data element from the hierarchical tree area 3820 related or associated with the information area 3810.

Figure 43:
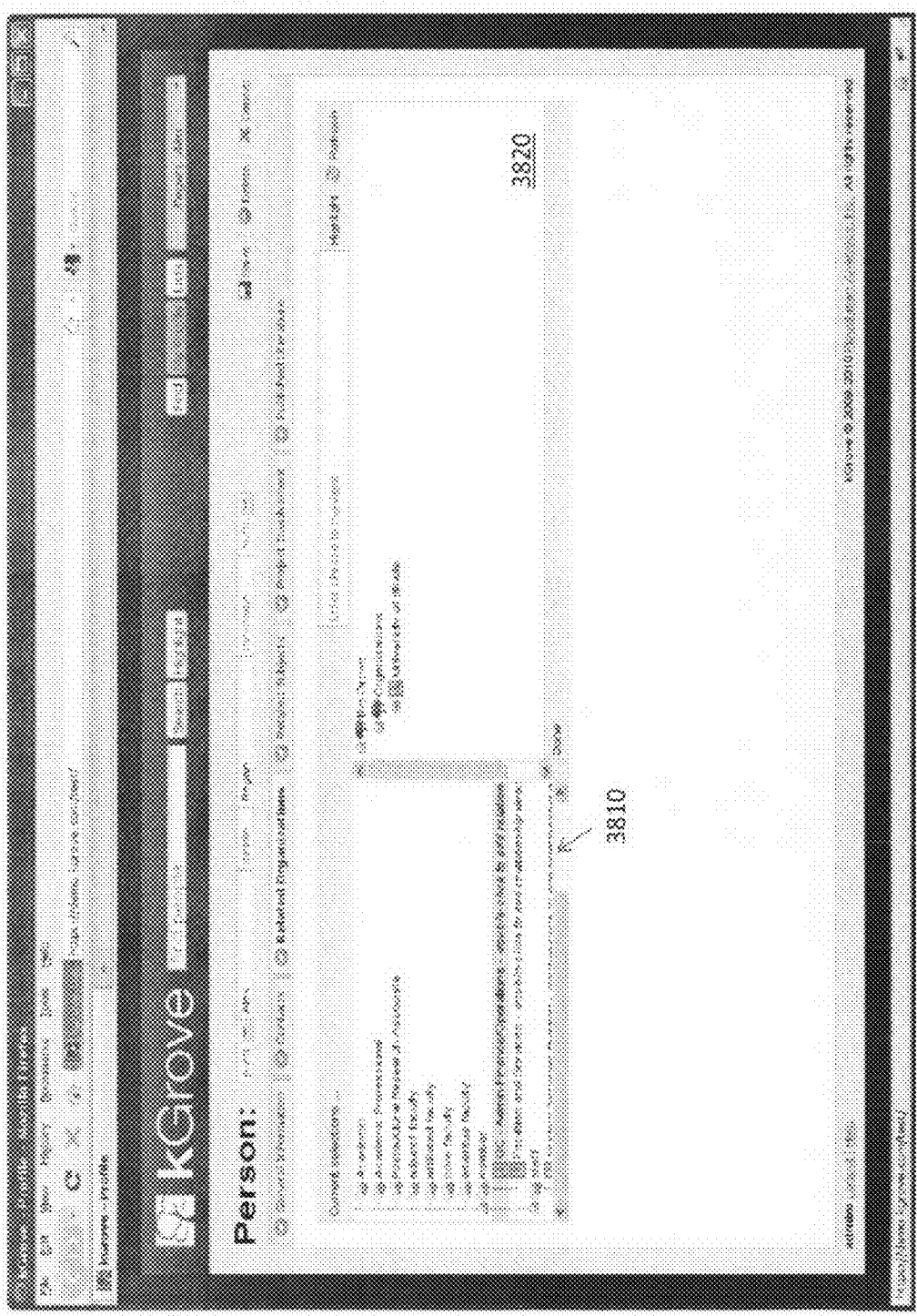

FIG. 43 illustrates the GUI 3800 where the information area 3810 includes a plurality of data elements with descriptions. In this example, a user may add or modify a description by selecting a data element. In response to selecting the data element, a window is generated which allows the user to enter a description to be used.

Figure 44:
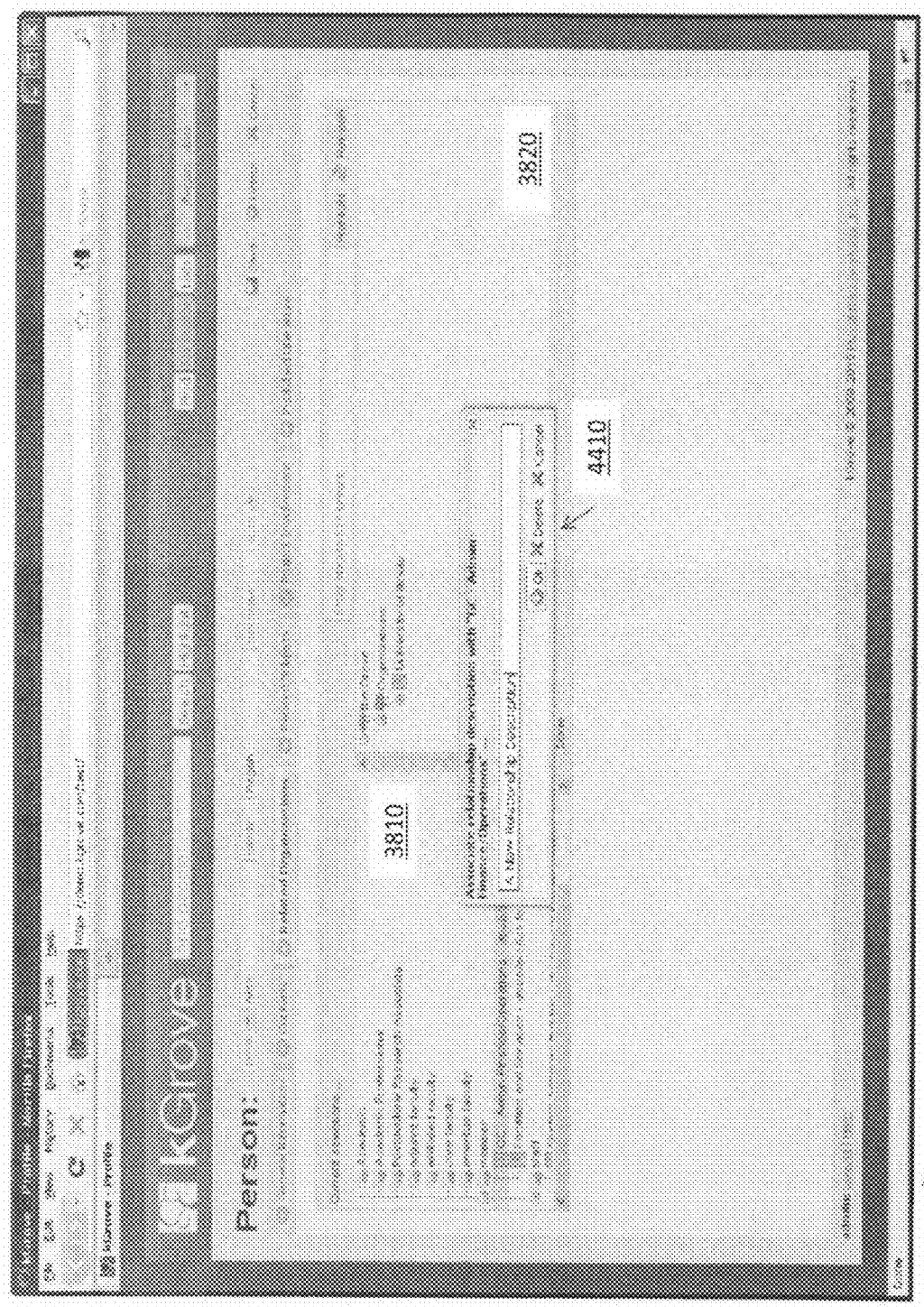

FIG. 44 illustrates the GUI 3800 with the window 4410 generated. As shown, a new description is entered by the user.

Figure 45:
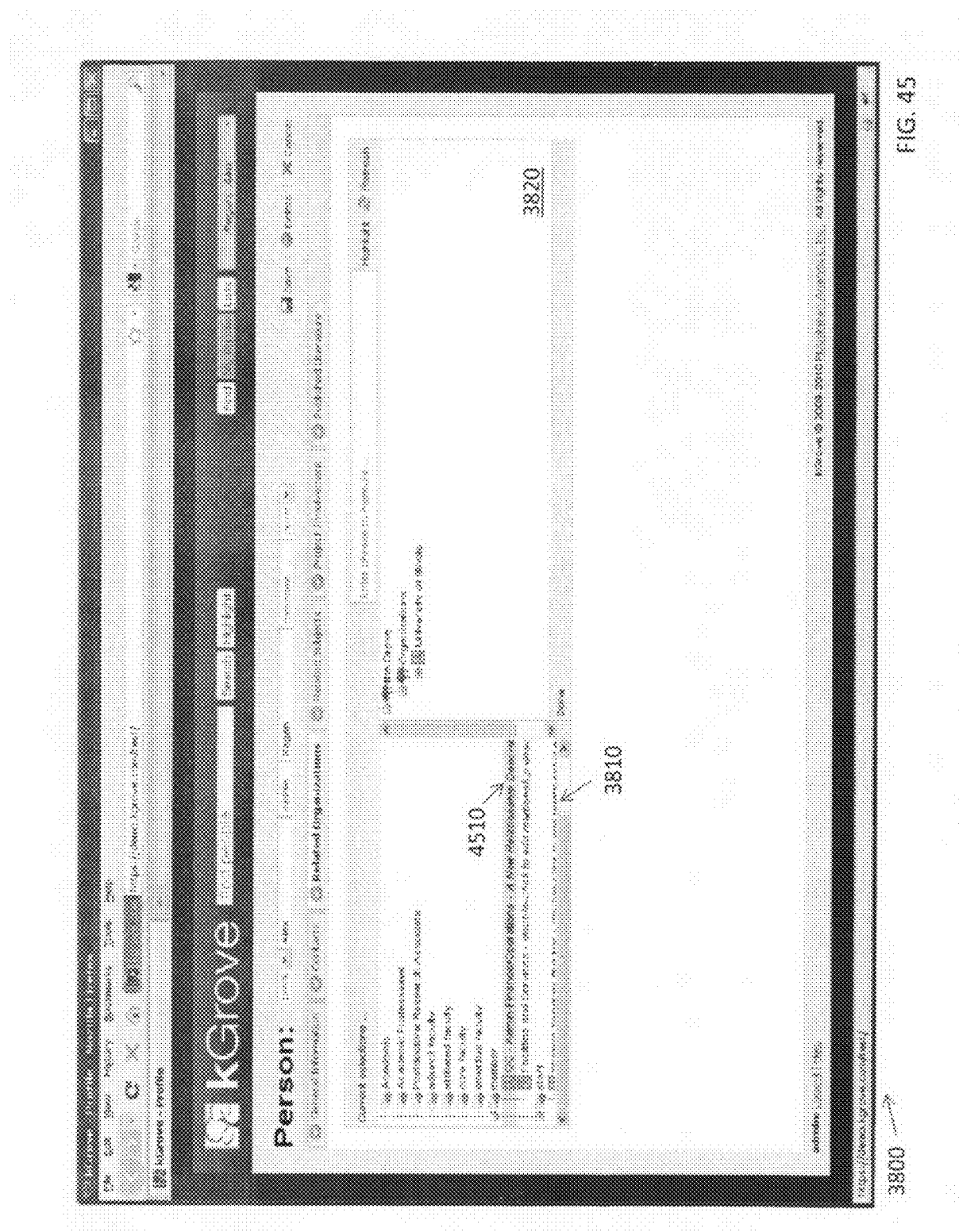

FIG. 45 illustrates the GUI 3800 with the new description 4510 associated with the data element in the information area 3810.

Figure 46:
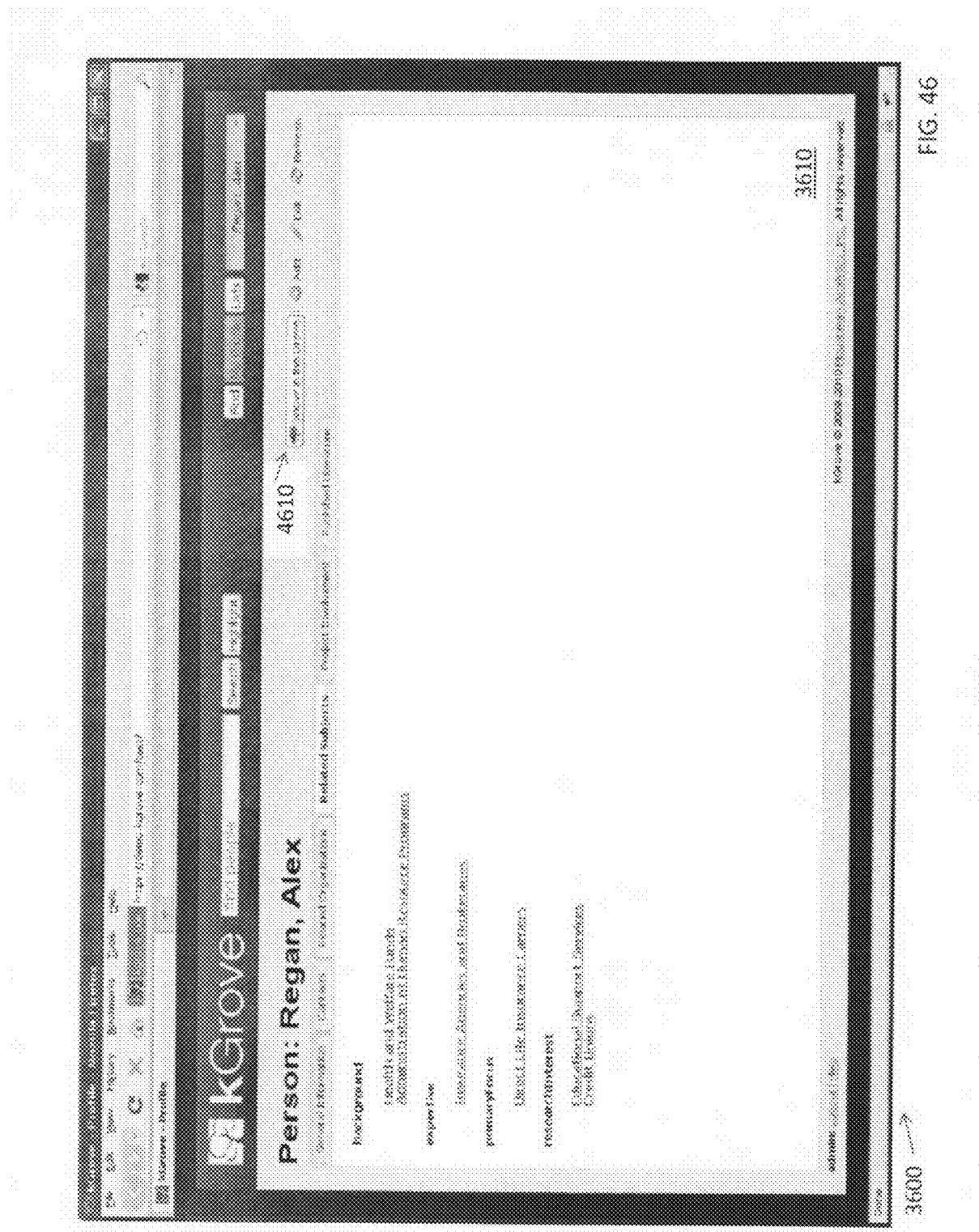

FIG. 46 illustrates the GUI 3600 that provides a general profile area 3610 for a matter. The GUI 3600 includes a select button 4610 which when selected allows the user to see where in the hierarchical tree structure the profile resides. Upon making the selection, the user is navigated back to the GUI 700 and a highlight action is initiated for that specific profile. This enables the user to see a distinct profile within the hierarchical tree structure even when there are multiple profiles with same label.

Figure 47:
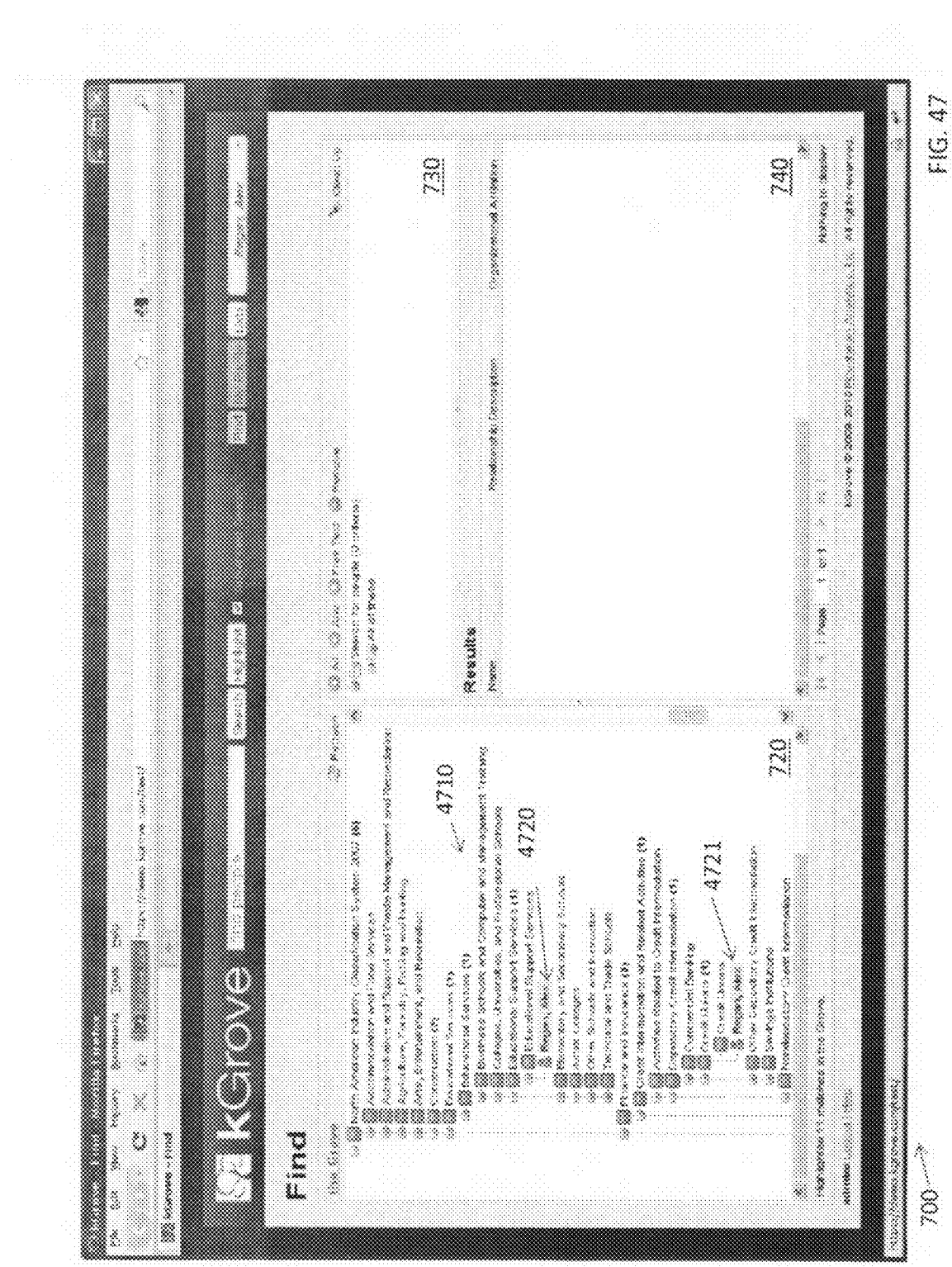

FIG. 47 illustrates the GUI 700 with a hierarchical tree structure 4710 in the hierarchical tree area 720. The data elements 4720 and 4721 associated with the profile illustrated in FIG. 46 is highlighted in response to selection of the select button 4610.

FIGS. 7-47 illustrate embodiments of the present invention performing searching and management of data related to people, subjects, and organizations. It should be appreciated that embodiments of the present invention may be used to search for and manage data pertaining to other areas and topics. Furthermore, the drawings illustrate exemplary embodiments of the present invention where the search term entry area, hierarchical tree area, search criteria tree area, and results area are arranged in a particular location. It should be appreciated that the search term entry area, hierarchical tree area, search criteria tree area, and results area may be arranged in a different manner. Furthermore, it should be appreciated that not all of the illustrated areas are necessarily required for practicing embodiments of the invention and that additional areas may also be added to the GUI.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A non-transitory computer readable medium including a sequence of instructions stored thereon for causing a computer to execute a method, comprising:
   generating a search term entry area operable to allow a user to enter text as a search term;
   generating a hierarchical tree area operable to display data elements in a multi-level hierarchical tree structure, wherein the data elements are representative of searchable data in a database;
   generating a search result area operable to display a result of a search query; and
   generating a search criteria tree area operable to allow a user to enter a new search query of the searchable data in response to the user's selection of one or more of the search term from the search term entry area, the data elements from the hierarchical tree area, and the result from the search result area, wherein the search criteria tree area enables the user to select the search term from the search term entry area, the data elements from the hierarchical tree area, and the result from the search result area for the new search query, and wherein the search term entry area, hierarchical tree area, search results area, and search criteria tree area are displayed together in a single window on a graphical user interface.

2. The non-transitory computer readable medium of claim 1, wherein the method further comprises generating a window that appears in response to a user's selection of one of the search term, data elements, and result in the search criteria tree area, wherein the window is operable to allow the user to modify a scope of the new search query by providing the user with selectable options to further define the one of the search term, data elements, and result.

3. The non-transitory computer readable medium of claim 1, wherein the method further comprises generating a filter text box in the search results area operable to allow the user to enter text used to filter the result of the search query displayed in the search results area.

4. The non-transitory computer readable medium of claim 1, wherein the hierarchical tree area is operable to highlight data elements associated with the search term entered in the search term entry area in response to a selection of a highlight option.

5. The non-transitory computer readable medium of claim 1, wherein the multi-level hierarchical tree structure is operable to organize data into a plurality of levels, wherein each sub-level provides a more specific description of the data than a level above.

6. The non-transitory computer readable medium of claim 1, wherein the hierarchical tree area is operable to display a portion of the multi-level hierarchical tree structure at a time and the elements on the multi-level hierarchical tree structure are selectable to expand the hierarchical tree to display additional sub-levels.

7. The non-transitory computer readable medium of claim 1, wherein the new search query is a Boolean search query.

8. The non-transitory computer readable medium of claim 1, wherein selection of one or more of the data elements and result is achieved by dragging and dropping the one or more data elements and result to the search criteria tree area using an input device.

9. The non-transitory computer readable medium of claim 1, wherein the method further comprises generating a second window that appears in response to a user's selection of one of the data elements from the hierarchical tree area and the result from the search results area, wherein the second window displays additional information about the one of the data elements and the result.

10. The non-transitory computer readable medium of claim 1, wherein the data elements on the multi-level hierarchical tree structure are representative of all the searchable data in the database.

11. The non-transitory computer readable medium of claim 1, wherein the new search query is a Boolean search query that includes AND, OR, and NOT functions.

12. A non-transitory computer readable medium including a sequence of instructions stored thereon for causing a computer to execute a method, comprising:
    generating a search term entry area operable to allow a user to enter text as a search term;
    generating a mapping area operable to display data elements on a map, wherein the data elements are representative of searchable data in a database;
    generating a search result area operable to display a result of a search query; and
    generating a search criteria tree area operable to allow a user to enter a new search query of the searchable data in response to the user's selection of one or more of the search term from the search term entry area, the data elements from the mapping area, and the result from the search result area, wherein the search criteria tree area enables the user to select the search term from the search term entry area, the data elements from the mapping area, and the result from the search result area for the new search query, and wherein the search term entry area, map area, search results area, and search criteria tree area are displayed together in a single window on a graphical user interface.

13. The non-transitory computer readable medium of claim 12, wherein the method further comprises generating a window that appears in response to a user's selection of one of the search term, data elements, and result in the search criteria tree area, wherein the window is operable to allow the user to modify a scope of the new search query by providing the user with selectable options to further define the one of the search term, data elements, and result.

14. The non-transitory computer readable medium of claim 12, wherein the method further comprises generating a filter text box in the search results area operable to allow the user to enter text used to filter the result of the search query displayed in the search results area.

15. The non-transitory computer readable medium of claim 12, wherein the new search query is a Boolean search query.

16. The non-transitory computer readable medium of claim 12, wherein selection of one or more of the data elements and result is achieved by dragging and dropping the one or more data elements and result to the search criteria tree area using an input device.

17. The non-transitory computer readable medium of claim 12, wherein the method further comprises generating a second window that appears in response to a user's selection of one of the data elements from the mapping area and the result from the search results area, wherein the second window displays additional information about the one of the data elements and the result.

18. The non-transitory computer readable medium of claim 12, wherein the data elements on the map are representative of all the searchable data in the database.

19. The non-transitory computer readable medium of claim 12, wherein the new search query is a Boolean search query that includes AND, OR, and NOT functions.

20. The non-transitory computer readable medium of claim 12, wherein the map comprises a geographical map.

21. The non-transitory computer readable medium of claim 12, wherein the map comprises a social graph.

22. A non-transitory computer readable medium including sequence of instructions stored thereon for causing a computer to execute a method, comprising:
generating a hierarchical tree area operable to display data elements in a multi-level hierarchical tree structure, wherein the data elements are representative of searchable data in a database; and
generating an information area, separate from the hierarchical tree area, operable to display information associated with a matter and operable to allow a user to enter additional information to associated with the matter and to store with the searchable data in the database in response to the user's selection of one or more data elements from the hierarchical tree area, wherein the hierarchical tree area and the information area are displayed together in a single window on a graphical user interface.

23. The non-transitory computer readable medium of claim 22, further comprising a search term entry area operable to allow the user to enter a search term, wherein the hierarchical tree area is operable to highlight data elements associated with the search term in response to a selection of a highlight option.

24. The non-transitory computer readable medium of claim 22, wherein the multi-level hierarchical tree structure is operable to organize data into a plurality of levels, wherein each sub-level provides a more specific description of the data than a level above.

* * * * *